US008822366B2

(12) United States Patent
Matsunaga et al.

(10) Patent No.: US 8,822,366 B2
(45) Date of Patent: Sep. 2, 2014

(54) SOLID TITANIUM CATALYST COMPONENT, CATALYST FOR OLEFIN POLYMERIZATION AND PROCESS FOR POLYMERIZING OLEFIN

(75) Inventors: Kazuhisa Matsunaga, Otake (JP); Kazutaka Tsuru, Yanai (JP); Kazumitsu Kawakita, Iwakuni (JP); Takashi Jinnai, Otake (JP); Tetsunori Shinozaki, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/734,390

(22) PCT Filed: Oct. 31, 2008

(86) PCT No.: PCT/JP2008/069877
§ 371 (c)(1),
(2), (4) Date: Apr. 29, 2010

(87) PCT Pub. No.: WO2009/057747
PCT Pub. Date: May 7, 2009

(65) Prior Publication Data
US 2010/0227991 A1    Sep. 9, 2010

(30) Foreign Application Priority Data
Nov. 1, 2007    (JP) ................................. 2007-285080

(51) Int. Cl.
*B01J 31/00*    (2006.01)
*B01J 37/00*    (2006.01)
*C08F 4/02*    (2006.01)
*C08F 4/60*    (2006.01)
*C08F 2/00*    (2006.01)
*C08F 110/06*    (2006.01)

(52) U.S. Cl.
CPC .................. *C08F 110/06* (2013.01)
USPC ....................... 502/127; 526/213

(58) Field of Classification Search
CPC ............. B01J 31/00; B01J 37/00; C08F 4/02; C08F 4/60; C08F 2/00
USPC ......................... 526/213; 502/127
See application file for complete search history.

(56) References Cited

U.S. PATENT DOCUMENTS

| | | | |
|---|---|---|---|
| 4,330,649 A | 5/1982 | Kioka et al. | |
| 4,401,589 A | 8/1983 | Kioka et al. | |
| 4,841,003 A * | 6/1989 | Kashiwa et al. | 526/125.3 |
| 4,952,649 A | 8/1990 | Kioka et al. | |
| 6,034,025 A | 3/2000 | Yang et al. | |
| 6,541,582 B1 | 4/2003 | Morini et al. | |
| 7,220,696 B2 | 5/2007 | Matsunaga et al. | |
| 7,649,062 B2 | 1/2010 | Matsunaga et al. | |
| 7,858,716 B2 | 12/2010 | Kobayashi et al. | |
| 8,232,358 B2 | 7/2012 | Kobayashi et al. | |
| 2008/0097050 A1 * | 4/2008 | Matsunaga et al. | 526/124.1 |
| 2008/0113860 A1 | 5/2008 | Ernst et al. | |
| 2008/0306228 A1 * | 12/2008 | Matsunaga et al. | 526/123.1 |

FOREIGN PATENT DOCUMENTS

| | | | |
|---|---|---|---|
| EP | 0 862 88 A1 | 8/1983 | |
| EP | 0086288 * | 8/1983 | |
| EP | 0125911 A1 | 11/1984 | |
| EP | 0585869 A1 | 3/1994 | |
| EP | 1 845 114 A1 | 10/2007 | |
| JP | 56-0811 A | 1/1981 | |
| JP | 58-83006 A | 5/1983 | |
| JP | 59-207904 A | 11/1984 | |
| JP | A-61-207405 | 9/1986 | |
| JP | 10-316712 A | 12/1998 | |
| JP | 2001-114811 A | 4/2001 | |
| JP | 2001114811 A * | 4/2001 | C08F 4/654 |
| JP | 2002-539298 A | 11/2002 | |
| JP | 2004-02742 A | 1/2004 | |

(Continued)

OTHER PUBLICATIONS

English translation of JP 2001114811A.*
International Search Report mailing date of Jan. 6, 2009 for International Application No. PCT/JP2008/069877, 2 pgs.

(Continued)

*Primary Examiner* — David W Wu
*Assistant Examiner* — Elizabeth Eng
(74) *Attorney, Agent, or Firm* — Foley & Lardner LLP

(57) ABSTRACT

The present invention provides an olefin polymerization catalyst, which is free of polyfunctional aromatic compounds and has a large particle diameter, and a solid titanium component (I) which forms the catalyst. The olefin polymerization catalyst comprises a solid titanium component (I), an organometallic compound (II) and optionally an electron donor (III) wherein the solid titanium component (I) comprising titanium, magnesium and halogen is obtainable by allowing a magnesium compound (A) having no reducing ability in a liquid state to contact with an ester compound (B) represented by the following formula (1) and a liquid titanium compound (C) in a specific order, (1)

$$R^1OOC\underset{R}{\overset{R}{\diagdown}}C^a\underset{R}{\overset{R^2}{\diagup}}C^a\underset{}{\overset{R}{\diagdown}}R$$
$$R\underset{R}{\overset{}{\diagdown}}C^a\underset{}{\overset{}{\diagup}}C^a\underset{}{\overset{R^3}{\diagdown}}R$$

wherein $R^2$ and $R^3$ are $COOR^1$ or R, and at least one of $R^2$ and $R^3$ is $COOR^1$, two or more $R^1$ each are a monovalent hydrocarbon group having 1 to 20 carbon atoms, and two or more R are a hydrogen atom, or a hydrocarbon group having 1 to 20 carbon atoms, and at least two of Rs may be bonded each other to form a ring, and the skeleton of the ring formed may include a double bond or a hetero atom.

1 Claim, No Drawings

(56) References Cited

FOREIGN PATENT DOCUMENTS

| | | |
|---|---|---|
| JP | 2006-521451 A | 9/2006 |
| JP | A-2006-298818 | 11/2006 |
| JP | A-2007-254671 | 10/2007 |
| JP | 2008-024751 A | 2/2008 |
| WO | WO 2006/077945 A1 | 7/2006 |
| WO | WO 2006/077946 A1 * 7/2006 ............. C08F 10/00 |
| WO | WO 2006077945 A1 * 7/2006 |

OTHER PUBLICATIONS

Communication (Supplementary EP Search Report) in EP Appln No. 08 84 6191 dated Sep. 14, 2010.

Japanese Office Action issued in corresponding application No. 2009-539125 dated Sep. 24, 2013.

* cited by examiner

SOLID TITANIUM CATALYST COMPONENT, CATALYST FOR OLEFIN POLYMERIZATION AND PROCESS FOR POLYMERIZING OLEFIN

TECHNICAL FIELD

The present invention relates to a solid titanium catalyst component used for olefin polymerization, particularly used for α-olefin polymerization preferably. Furthermore, the present invention relates to an olefin polymerization catalyst containing the above solid titanium catalyst component. Moreover, the present invention relates to a process for polymerizing an olefin using the above olefin polymerization catalyst.

BACKGROUND ART

A catalyst containing a titanium compound supported on a halogenated magnesium in an active state has been known conventionally as a catalyst used for producing olefin polymers such as ethylene, an α-olefin homopolymer, and an ethylene.α-olefin copolymer, etc. (Hereinafter, the meaning of polymerization occasionally includes not only homopolymerization but also copolymerization such as random copolymerization, block copolymerization, etc.)

As such an olefin polymerization catalyst, widely known are a catalyst called as Zeigler-Natta catalyst which comprises titanium tetrachloride or titanium trichloride and a catalyst which comprises an organometallic compound and a solid titanium catalyst component comprising magnesium, titanium, halogen and an electron donor.

The latter catalyst shows high activity for polymerization of ethylene, and α-olefins such as propylene, butene-1, etc. Moreover, a resulting α-olefin polymer sometimes has high stereoregularity.

JP-A-S58 (1983)-83006 (Patent Document 1) and JP-A-S56 (1981)-811 (Patent Document 2) disclose when, of these catalysts, a solid titanium catalyst component on which an electron donor selected from carboxylic acid esters typified by phthalic acid ester is supported, an aluminum-alkyl compound as a co-catalyst component and a silicon compound having at least one structure represented by Si—OR (in the formula, R is a hydrocarbon group) are used particularly, excellent polymerization activity and stereospecificity can be realized.

It is known that the enlargement of a catalyst particle diameter is preferred from the viewpoints of "increasing of the rubber amount in the preparation of impact copolymers" or "prevention of particles from scattering in a gas phase step". The methods as described in the above patent documents include a step of allowing a magnesium compound in a liquid state to contact with a titanium compound in a liquid state. The documents further disclose that the resulting polymers prepared using these catalysts show good morphology and can be prepared by a relatively simple method, but it is difficult to enlarge the catalyst particle diameter.

As a method for producing a catalyst having a large particle diameter, there are disclosed a method of using an adduct having a large diameter comprising $MgCl_2$ and ethanol as a carrier (JP-A-2004-2742 (Patent document 3) etc), a method of using a carrier having a large particle diameter such as $Mg(OEt)_2$, $SiO_2$, etc (JP-A-2001-114811 (patent document 4) etc) and a method of preparing a polymer having a large particle diameter by using various alcohols and cyclic ethers and thereby controlling the sizes of catalyst particles in the preparation of a magnesium compound having no reducing ability in a liquid state (JP-A-H10 (1998)-316712 (Patent document 5) etc). These methods, however, have tendencies that the production process is complicated and the production cost is high.

Meanwhile, there is a trend such that the use of polyfunctional aromatic compounds such as phthalic acid esters etc is restrained from the safety and hygienic problems. Against the trend, almost of reports including the above patent documents disclose examples that polyfunctional aromatic compounds such as phthalic acid esters are used preferably as an electron donor. Patent document 4 discloses that a catalyst free from aromatic esters is prepared by using the simple production process disclosed in Patent document 1 or Patent document 2. However, it is not said that the resulting catalyst is free of polyfunctional aromatic compounds because of using a phthalic anhydride as a starting material.

Patent document 1: JP-A-S58 (1983)-83006
Patent document 2: JP-A-S56 (1981)-811
Patent document 3: JP-A-2004-2742
Patent document 4: JP-A-2001-114811
Patent document 5: JP-A-H10 (1998)-316712

DISCLOSURE OF THE INVENTION

Problems to be Solved by the Invention

Under the circumstances, the advent of an olefin polymerization catalyst having a low production cost and free of polyfunctional aromatic compounds has been desired.

It is an object of the present invention to provide an olefin polymerization catalyst component free of polyfunctional aromatic compounds and having a large particle diameter with a relatively simple production process, and it is another object of the invention to provide an olefin polymerization catalyst containing the above component.

Means for Solving the Problems

The present inventors have been studied for solving the above objects. As a result, they found that a solid titanium catalyst component obtainable by allowing a magnesium compound (A) having no reducing ability in a liquid state to contact with an ester compound (B) having a specific structure and a liquid titanium compound (C) in a specific order has a larger particle diameter of over 30 μm as compared with conventional ones. Thus, the present invention has been accomplished.

That is to say, the present invention provides the solid titanium catalyst component which comprises titanium, magnesium and a halogen and is obtainable by allowing the magnesium compound (A) having no reducing ability in a liquid state to contact with the ester compound (B) represented by the following formula (1) and the liquid titanium compound (C) provided that the ester compound (B) is allowed to contact with the magnesium compound (A) prior to the liquid titanium compound (C) or simultaneously with liquid titanium compound (C).

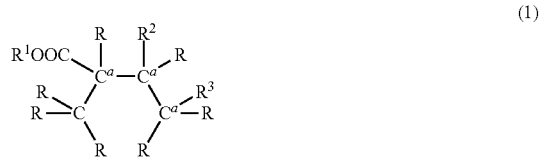

(1)

wherein $R^2$ and $R^3$ each are independently $COOR^1$ or R, and at least one of $R^2$ and $R^3$ is $COOR^1$, a single bond excluding $C^a$—$C^a$ bond in the skeleton may be replaced with a double bond, two or more $R^1$ each are independently a monovalent hydrocarbon group having 1 to 20 carbon atoms, and two or more R each are independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and at least two of the two or more R may be bonded each other to form a ring, and the skeleton of the ring formed with the Rs may include a double bond or a hetero atom.

In the solid titanium catalyst component of the present invention, the ester compound (B) preferably has a cyclic ester structure represented by the following formula (2).

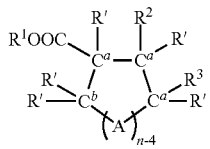

(2)

wherein n is an integer of 5 to 10, $R^2$ and $R^3$ each are independently $COOR^1$ or R' and at least one of $R^2$ and $R^3$ is $COOR^1$, a single bond in the cyclic skeleton excluding $C^a$—$C^a$ bond and $C^a$—$C^b$ bond in the case that $R^3$ is a hydrogen atom may be replaced with a double bond, two or more $R^1$ each are independently a mono-valent hydrocarbon group having 1 to 20 carbon atoms, and A is

or a hetero atom.

Two or more R' each are independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and at least two of the two or more R' may be bonded each other to form a ring, and the skeleton of the ring formed with the R's may include a double bond or a hetero atom.

In the solid titanium catalyst component according to the present invention, n is preferably 6 in the formula (2). Moreover, it is preferred that $R^2$ be $COOR^1$ and $R^3$ be R' in the formula (2).

With regard to the contacting order of each component according to the present invention, it is preferred to allow the magnesium compound (A) having no reducing ability in a liquid state to contact with the ester compound (B) represented by the formula (1) prior to the liquid titanium compound (C), and then to contact with an ester compound (B1) represented by the formula (1) which may be the same as or different from the ester compound (B) provided that the liquid titanium compound (C) may be divided and contacted several times.

In the solid titanium catalyst component according to the present invention, the ester compound (B) and the ester compound (B1) preferably each have a cyclic ester structure represented by the following formula (2).

Furthermore, in the solid titanium catalyst component according to the present invention, n is preferably 6 in the formula (2). Moreover, in the formula (2), it is preferred that $R^2$ be $COOR^1$ and $R^3$ be R'.

In the present invention, it is particularly preferred that two or more $R^1$ of the ester compound (B) each be independently a monovalent hydrocarbon group having 2 to 3 carbon atoms, and two or more $R^1$ of the ester compound (B1) each be a monovalent hydrocarbon group having 1 to 20 carbon atoms.

The olefin polymerization catalyst of the present invention comprises:
the above solid titanium catalyst component (I),
an organometallic compound (II) and optionally
an electron donor (III).

The process for polymerizing an olefin according to the present invention comprises polymerizing an olefin in the presence of the above olefin polymerization catalyst.

Effect of the Invention

When the solid titanium catalyst components, the olefin polymerization catalyst and the process for polymerizing an olefin according to the present invention are used, the following effects are excepted for example, not only the operation in a gas phase polymerization step is stabilized in the preparation of impact copolymers but also various olefin polymers can be produced by the gas phase polymerization easily. Moreover, because polyfunctional aromatic compounds are not contained at all, it is possible to provide the catalyst capable of conforming to the above trend toward the regulations on safety and hygienic problems.

BEST MODE FOR CARRYING OUT THE INVENTION

The solid titanium catalyst component (I) according to the present invention comprises titanium, magnesium and halogen, and is obtainable by allowing a magnesium compound (A) having no reducing ability in a liquid state to contact with an ester compound (B) represented by the formula (1) and a liquid titanium compound (C) provided that the ester compound (B) is allowed to contact with the magnesium compound (A) prior to the liquid titanium compound (C) or simultaneously with liquid titanium compound (C), or by allowing the magnesium compound (A) having no reducing ability in a liquid state to contact with the ester compound (B) represented by the formula (1) prior to the liquid titanium compound (C) and then allowing to contact with an ester compound (B1) represented by the formula (1) which may be the same as or different from the ester compound (B) provided that the liquid titanium compound (C) may be divided and contacted several times.

Each component of the present invention will be described below.

[Magnesium Compound (A) Having No Reducing Ability in a Liquid State]

As the magnesium compound (A) used in the preparation of the solid titanium catalyst component (I) according to the present invention, there are magnesium compounds described in, for example, JP-A-S58 (1983)-83006 and JP-A-S56 (1981)-811 (Patent documents 1 and 2)

In the preparation of the magnesium compound (A) having no reducing ability in a liquid state, it is possible to use known magnesium compounds, for example, magnesium halides such as magnesium chloride, magnesium bromide, etc;

alkoxy magnesium halides or aryloxy magnesium halides such as methoxy magnesium chloride, ethoxy magnesium chloride, phenoxy magnesium chloride, etc;

alkoxy magnesiums such as ethoxy magnesium, isopropoxy magnesium, butoxy magnesium, 2-ethyl hexoxy magnesium, etc;

aryloxy magnesiums such as phenoxy magnesium etc; and magnesium carboxylates such as magnesium stearate etc.

These magnesium compounds may be used singly or two or more may be used in combination. Furthermore, these magnesium compounds may be complex compounds or double compounds with other metals, or mixtures with other metal compounds.

Among these compounds, it is preferred to use magnesium halides, particularly magnesium chloride, and also it is preferred to use alkoxy magnesiums such as ethoxy magnesium. Moreover, the magnesium compounds may be those derived from other substances, for example, those obtainable by allowing an organomagnesium compound to contact with titanium halide, silicon halide, halogenated alcohol such as Grignard reagent.

In the preparation of the magnesium compound (A) having no reducing ability in a liquid state, it is preferred to use an electron donor (a). The electron donor (a) has no reducing ability at a temperature of room temperature to about 300° C. Preferable examples thereof are known compounds capable of solving the above solid magnesium compound in inert solvents such as liquid hydrocarbon etc. For example, it is preferred to use alcohols, aldehydes, amines, carboxylic acids and their mixtures.

Examples of alcohols capable of solving the above magnesium compound are aliphatic alcohols such as methanol, ethanol, propanol, butanol, isobutanol, ethylene glycol, 2-methyl pentanol, 2-ethyl butanol, n-heptanol, n-octanol, 2-ethyl hexanol, decanol and dodecanol;

alicyclic alcohols such as cyclohexanol and methyl cyclohexanol;

aromatic alcohols such as benzyl alcohol and methyl benzyl alcohol; and aliphatic alcohols containing an alkoxy group such as n-butyl cellosolve etc.

Examples of aldehydes may include aldehydes having 7 or more carbon atoms such as capric aldehyde and 2-ethylhexyl aldehyde.

Examples of amines may include amines having 6 or more carbon atoms such as heptyl amine, octyl amine, nonyl amine, lauryl amine and 2-ethylhexylamine.

Examples of carboxylic acids may include organocarboxylic acids having 7 or more carbon atoms such as capric acid and 2-ethylhexanoic acid.

Among the above electron donors (a), alcohols are preferable, and particularly, ethanol, propanol, butanol, isobutanol, hexanol, 2-ethylhexanol and decanol are preferable.

In the preparation of the magnesium compound (A) having no reducing ability in a liquid state, the amounts of the magnesium compound and electron donor (a) used vary depending on the kind and contacting conditions thereof. The magnesium compound is used in an amount of 0.1 to 20 mol/l, preferably 0.5 to 5 mol/l per unit volume of the electron donor (a). In the preparation of the magnesium compound (A) having no reducing ability in a liquid state, preferable examples of the inert medium include known hydrocarbon compounds such as heptane, octane and decane.

Since the composition ratio of the magnesium to the electron donor (a) in the magnesium compound (A) having no reducing ability in a liquid state differs depending on the kind of the compound used, it can be not defined necessarily. The electron donor (a) is used in an amount of not less than 2.0 mol, preferably not less than 2.2 mol, more preferably not less than 2.4 mol, particularly preferably not less than 2.6 mol and not more than 5 mol per 1 mol of magnesium in the magnesium compound.

[Ester Compound (B)]

The ester compound (B) used in the preparation of the solid titanium catalyst component (I) according to the present invention has two or more carboxylic acid ester groups and is represented by the following formula (1). In the formula (1), $C^a$ is a carbon atom.

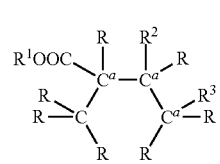

(1)

In the formula (1), $R^2$ and $R^3$ each are independently $COOR^1$ or R, and at least one of $R^2$ and $R^3$ is $COOR^1$.

In the skeleton, all the carbon-carbon bonds are preferably single bonds, but any of single bonds except for $C^a$—$C^a$ bond in the skeleton may be replaced with a double bond.

Two or more $R^1$ each are independently a monovalent hydrocarbon group having 1 to 20 carbon atoms, preferably 1 to 10 carbon atoms, more preferably 1 to 8 carbon atoms, especially 2 to 3 carbon atoms. Examples of the hydrocarbon groups are methyl, ethyl, n-propyl, i-propyl, n-butyl, isobutyl, neopentyl, hexyl, heptyl, octyl, 2-ethylhexyl, decyl, dodecyl, tetradecyl, hexadecyl, octadecyl, and eicosyl groups. Preferable examples are methyl, ethyl, n-propyl, i-propyl, n-butyl, isobutyl, neopentyl, 2-ethylhexyl groups. Particularly, ethyl, n-propyl and i-propyl groups are preferable in the viewpoint of preparing a solid titanium catalyst component having a large particle diameter.

Two or more R each are independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

As the two or more R except for a hydrogen atom, a hydrocarbon group having 1 to 20 carbon atoms is preferable among them. Examples of the hydrocarbon group having 1 to 20 carbon atoms may include aliphatic hydrocarbon groups, alicyclic hydrocarbon groups and aromatic hydrocarbon groups such as methyl, ethyl, n-propyl, i-propyl, n-butyl, i-butyl, sec-butyl, n-pentyl, cyclopentyl, n-hexyl, cyclohexyl, vinyl, phenyl and octyl groups.

Moreover, at least two of the two or more R may be bonded to form a ring. The skeleton of the ring formed by bonding of the two or more R may include a double bond or a hetero atom. When the skeleton of the ring includes at least two $C^a$ bonded with $COOR^1$, the number of carbon atoms constituting the skeleton of the ring is 5 to 10.

Examples of $R^2$ and $R^3$ except for $COOR^1$ are preferably a hydrogen atom or a hydrocarbon group. Among them, preferable examples are a hydrogen atom, secondary alkyls such as i-propyl group, sec-butyl group, 2-pentyl group or 3-pentyl group and cycloalkyl groups such as cyclohexyl group, cyclopentyl group and cyclohexyl methyl group. In the above, at least one of $R^2$ and $R^3$ except for $COOR^1$ bonded to $C^a$ is preferably a hydrogen atom.

Examples of the ester compound (B) represented by the formula (1) are mixtures in a (S,R) (S,R) pure state or a racemic state of 2,3-bis(2-ethylbutyl)diethyl succinate,
2,3-dibenzyl diethyl succinate,
2,3-diisopropyl diethyl succinate,
2,3-diisopropyl diisobutyl succinate,
2,3-bis(cyclohexylmethyl) diethyl succinate,
2,3-diisobutyl diethyl succinate,
2,3-dineopentyl diethyl succinate,
2,3-dicyclopentyl diethyl succinate, and
2,3-dicyclohexyl diethyl succinate.

Other examples thereof are:
sec-butyl diethyl succinate,
texyl diethyl succinate,
cyclopropyl diethyl succinate,
norbornyl diethyl succinate,
(10-)perhydronaphtyl diethyl succinate,
trimethylsillyl diethyl succinate,
methoxy diethyl succinate,
p-methoxyphenyl diethyl succinate,
p-chlorophenyl diethyl succinate,
phenyl diethyl succinate,
cyclohexyl diethyl succinate,
benzyl diethyl succinate,
(cyclohexylmethyl) diethyl succinate,
t-butyl diethyl succinate,
iso-butyl diethyl succinate,
isopropyl diethyl succinate and
neopentyl diethyl succinate.

Moreover, other examples thereof are:
2,2-dimethyl diethyl succinate,
2-ethyl-2-methyl diethyl succinate,
2-benzyl-2-isopropyl diethyl succinate,
2-(cyclohexylmethyl)-2-isobutyl diethyl succinate,
2-cyclopentyl-2-n-propyl diethyl succinate,
2,2-diisobutyl diethyl succinate,
2-cyclohexyl-2-ethyl diethyl succinate,
2-isopropyl-2-methyl diethyl succinate,
2,2-diisopropyl diethyl succinate,
2-isobutyl-2-ethyl diethyl succinate,
2-(1,1,1-trifluoro-2-propyl)-2-methyl diethyl succinate,
2-isopentyl-2-isobutyl diethyl succinate,
2-phenyl-2-n-butyl diethyl succinate,
2,2-dimethyl diisobutyl succinate,
2-ethyl-2-methyl diisobutyl succinate,
2-benzyl-2-isopropyl diisobutyl succinate,
2-(cyclohexylmethyl)-2-isobutyl diisobutyl succinate,
2-cyclopentyl-2-n-propyl diisobutyl succinate,
cyclobutane-1,2-ethyl dicarbonate and
3-methylcyclobutane-1,2-ethyl dicarbonate.

Preferable examples of the compound having a cyclic structure in which the groups R in the formula (1) are bonded may include compounds represented by the following formula (2). In the formula, $C^a$ and $C^b$ represent carbon atoms.

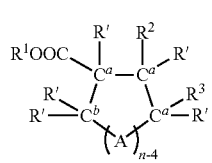

(2)

In the formula (2), n is an integer of 5 to 10, preferably 5 to 8, more preferably 5 to 7.

$R^2$ and $R^3$ each are independently $COOR^1$ or R' and at least one of $R^2$ and $R^3$ is $COOR^1$. It is preferred that $R^2$ be $COOR^1$ and $R^3$ be R'.

All the carbon-carbon bonds in the cyclic skeleton are preferably single bonds, but any one of single bonds in the cyclic skeleton except for $C^a$—$C^a$ bond and $C^a$—$C^b$ bond in the case that $R^3$ is a hydrogen atom may be replaced with a double bond.

Two or more $R^1$ are hydrocarbon groups having 1 to 20 carbon atoms similar to $R^1$ of the compound represented by the formula (1), preferably hydrocarbon groups having 1 to 8 carbon atoms, more preferably hydrocarbon groups having 2 to 3 carbon atoms. Suitable examples of $R^1$ are methyl, ethyl, n-propyl, i-propyl, n-butyl, isobutyl, neopentyl and 2-ethylhexyl groups. In the viewpoint of preparing a solid titanium catalyst component having a large particle diameter, especially preferable examples are ethyl, n-propyl and i-propyl groups.

When the carbon number deviates from this range, the resulting solid titanium catalyst component does not have a large particle diameter or is in a fine particulate state with the result in that it is sometimes difficult to recover it by filtration or decantation.

A is

or a hetero atom.

A is preferably

, and the ring formed by $C^a$, $C^b$ and A preferably has a cyclic carbon structure, more preferably a saturated alicyclic structure that is constituted by only carbons.

Two or more R' each are independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

As the two or more R' except for a hydrogen atom, a hydrocarbon group having 1 to 20 carbon atom is preferable among them. Examples of the hydrocarbon group having 1 to 20 carbon atoms may include aliphatic hydrocarbon groups, alicyclic hydrocarbon groups and aromatic hydrocarbon groups such as methyl, ethyl, n-propyl, i-propyl, n-butyl, i-butyl, sec-butyl, n-pentyl, cyclopentyl, n-hexyl, cyclohexyl, vinyl, phenyl and octyl groups.

Moreover, the two or more R' may be bonded each other to form a ring. The skeleton of the ring formed by bonding of the two or more R' may include a double bond or a hetero atom. When the skeleton of the ring includes at least two $C^a$ bonded with $COOR^1$, the number of carbon atoms constituting the skeleton of the ring is 5 to 10.

Examples of the skeleton of such a ring are a norbornane skeleton, a tetracyclododecene skeleton, etc.

The two or more R' may be a carboxylic acid ester group, an alkoxy group, a siloxy group and carbonyl structure-containing groups such as an aldehyde group and an acetyl group.

As R', a hydrogen atom or a hydrocarbon group is preferred.

Examples of the ester compound (B) represented by the formula (2) may include:
cyclohexane-1,2-diethyl dicarboxylate,
cyclohexane-1,2-di-n-propyl dicarboxylate,
cyclohexane-1,2-diisopropyl dicarboxylate,
cyclohexane-1,3-diethyl dicarboxylate,
cyclohexane-1,3-di-n-propyl dicarboxylate,
cyclohexane-1,3-diisopropyl dicarboxylate,
3-methylcyclohexane-1,2-diethyl dicarboxylate,
3-methylcyclohexane-1,2-di-n-propyl dicarboxylate,
3-methylcyclohexane-1,2-diisopropyl dicarboxylate,
4-methylcyclohexane-1,3-diethyl dicarboxylate,
4-methylcyclohexane-1,3-di-n-propyl dicarboxylate,
4-methylcyclohexane-1,2-diethyl dicarboxylate,
4-methylcyclohexane-1,2-di-n-propyl dicarboxylate,
4-methylcyclohexane-1,2-diisopropyl dicarboxylate,
5-methylcyclohexane-1,3-diethyl dicarboxylate,
5-methylcyclohexane-1,3-di-n-propyl dicarboxylate,
5-methylcyclohexane-1,3-diisopropyl dicarboxylate,
3,4-dimethylcyclohexane-1,2-diethyl dicarboxylate;
3,4-dimethylcyclohexane-1,2-di-n-propyl dicarboxylate,
3,4-dimethylcyclohexane-1,2-di-isopropyl dicarboxylate,
3,6-dimethylcyclohexane-1,2-diethyl dicarboxylate,
3,6-dimethylcyclohexane-1,2-di-n-propyl dicarboxylate,
3,6-dimethylcyclohexane-1,2-diisopropyl dicarboxylate,
3-hexylcyclohexane-1,2-diethyl dicarboxylate,
3-hexylcyclohexane-1,2-di-n-propyl dicarboxylate,
3,6-dihexylcyclohexane-1,2-di-n-propyl dicarboxylate,
3-hexyl-6-pentylcyclohexane-1,2-diethyl dicarboxylate,
cyclopentane-1,2-diethyl dicarboxylate,
cyclopentane-1,2-di-n-propyl dicarboxylate,
cyclopentane-1,2-diisopropyl dicarboxylate,
cyclopentane-1,3-diethyl dicarboxylate,
cyclopentane-1,3-di-n-propyl dicarboxylate,
3-methylcyclopentane-1,2-diethyl dicarboxylate,
3-methylcyclopentane-1,2-di-n-propyl dicarboxylate,
3-methylcyclopentane-1,2-diisopropyl dicarboxylate,
4-methylcyclopentane-1,3-diethyl dicarboxylate,
4-methylcyclopentane-1,3-di-n-propyl dicarboxylate,
4-methylcyclopentane-1,3-diisopropyl dicarboxylate,
4-methylcyclopentane-1,2-diethyl dicarboxylate,
4-methylcyclopentane-1,2-di-n-propyl dicarboxylate,
4-methylcyclopentane-1,2-diisopropyl dicarboxylate,
5-methylcyclopentane-1,3-diethyl dicarboxylate,
5-methylcyclopentane-1,3-di-n-propyl dicarboxylate,
3,4-dimethylcyclopentane-1,2-diethyl dicarboxylate,
3,4-dimethylcyclopentane-1,2-di-n-propyl dicarboxylate,
3,4-dimethylcyclopentane-1,2-diisopropyl dicarboxylate,
3,5-dimethylcyclopentane-1,2-diethyl dicarboxylate,
3,5-dimethylcyclopentane-1,2-di-n-propyl dicarboxylate,
3,5-dimethylcyclopentane-1,2-diisopropyl dicarboxylate,
3-hexylcyclopentane-1,2-diethyl dicarboxylate,
3,5-dihexylcyclopentane-1,2-diethyl dicarboxylate,
cycloheptane-1,2-diethyl dicarboxylate,
cycloheptane-1,2-di-n-propyl dicarboxylate,
cycloheptane-1,2-diisopropyl dicarboxylate,
cycloheptane-1,3-diethyl dicarboxylate,
cycloheptane-1,3-di-n-propyl dicarboxylate,
3-methylcycloheptane-1,2-diethyl dicarboxylate,
3-methylcycloheptane-1,2-di-n-propyl dicarboxylate,
3-methylcycloheptane-1,2-diisopropyl dicarboxylate,
4-methylcycloheptane-1,3-diethyl dicarboxylate,
4-methylcycloheptane-1,2-diethyl dicarboxylate,
4-methylcycloheptane-1,2-di-n-propyl dicarboxylate,
4-methylcycloheptane-1,2-diisopropyl dicarboxylate,
5-methylcycloheptane-1,3-diethyl dicarboxylate,
3,4-dimethylcycloheptane-1,2-diethyl dicarboxylate,
3,4-dimethylcycloheptane-1,2-di-n-propyl dicarboxylate,
3,4-dimethylcycloheptane-1,2-diisopropyl dicarboxylate,
3,7-dimethylcycloheptane-1,2-diethyl dicarboxylate,
3,7-dimethylcycloheptane-1,2-di-n-propyl dicarboxylate,
3,7-dimethylcycloheptane-1,2-diisopropyl dicarboxylate,
3-hexylcycloheptane-1,2-diethyl dicarboxylate,
3,7-dihexylcycloheptane-1,2-diethyl dicarboxylate,
cyclooctane-1,2-diethyl dicarboxylate,
3-methylcyclooctane-1,2-diethyl dicarboxylate,
cyclodecane-1,2-diethyl dicarboxylate,
3-methylcyclodecane-1,2-diethyl dicarboxylate,
cyclo-oxypentane-3,4-diethyl dicarboxylate and
3,6-dicyclohexylcyclohexane-1,2-ethyl dicarboxylate.

Furthermore, the compounds that two R' are bonded each other to form a ring and have a hetero atom in the cyclic structure may include compounds represented by the following formulas.

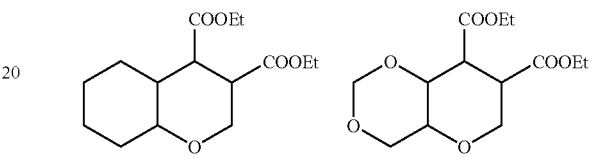

Moreover, preferable examples of the compounds may include dicarboxylic acid esters of cyclic diol compounds corresponding to these compounds.

Particularly, preferable examples thereof are:
cyclohexyl-1,2-diacetate,
cyclohexyl-1,2-dibutanate,
cyclohexyl-1,2-dipentanate,
cyclohexyl-1,2-dihexanate,
cyclohexyl-1,2-dibenzoate,
cyclohexyl-1,2-ditoluate,
3,6-dimethylcyclohexyl-1,2-diacetate,
3,6-dimethylcyclohexyl-1,2-dibutanate,
3,6-dimethylcyclohexyl-1,2-pentanate,
3,6-dimethylcyclohexyl-1,2-dihexanate,
3-methyl-6-propylcyclohexyl-1,2-diolacetate,
3-methyl-6-propylcyclohexyl-1,2-dibutanate,
3,6-dimethylcyclohexyl-1,2-dibenzoate,
3,6-dimethylcyclohexyl-1,2-ditoluate,
3-methyl-6-propylcyclohexyl-1,2-dibenzoate and
3-methyl-6-propylcyclohexyl-1,2-ditoluate.

Among them, it is particularly preferred to use dibutanate compounds and dipentanate compounds.

In the above diester structure-containing compounds, isomers such as cis and trans are present. The compounds having any of the structures mostly have the effects satisfying the objects of the present invention.

Among of the above compounds, cyclohexane dicarboxylic acid esters represented by the formula (2) in which n=6 are particularly preferred on the grounds not only the catalyst performance but also the relatively inexpensive preparation of these compounds utilizing Diels Alder reaction.

These compounds may be used singly or two or more may be used in combination. Moreover, these compounds may be combined with the electron donor (D) as described later and used as far as the object of the present invention is not missed.

Furthermore, these ester compounds (B) may be formed in the course for preparing the solid titanium catalyst component (I). For example, they can be formed in the course of contacting with the magnesium compound (A). More specifically, in the contacting with the magnesium compound (A), the ester compounds (B) can be contained in the solid titanium catalyst component by providing a step that an anhydrous carboxylic acid corresponding to the above compound and an alcohol corresponding to a carboxylic acid halide is substantially contacted.

[Ester Compound (B1)]

The ester compound (B1) used in the preparation of the solid titanium catalyst component (I) according to the present invention is the same as the ester compound (B) represented by the formula (1).

In the formula (1), the two or more $R^1$ each are independently a monovalent hydrocarbon groups having 1 to 20 carbon atoms, preferably 1 to 10 carbon atoms, more preferably 2 to 8 carbon atoms, furthermore preferably 4 to 8 carbon atoms, especially 4 to 6 carbon atoms. Examples of the hydrocarbon groups are ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Among them, in the viewpoint that olefin polymers having a wide molecular weight distribution can be easily produced, n-butyl group, isobutyl group, hexyl group and octyl group are preferred, and further n-butyl group and isobutyl group are particularly preferred.

In the formula (1), the two or more R each are independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, but at least one R is not a hydrogen atom.

The two or more R other than a hydrogen atom are preferably aliphatic hydrocarbon groups, and preferable examples thereof are methyl group, ethyl group, n-propyl group, iso-propyl group, n-butyl group, iso-butyl group and sec-butyl group.

Examples of the ester compounds (B1) may be same as those of the ester compound (B).

Among the compounds represented by the formula (1) used as the ester compound (B1), preferable examples of the compounds having a cyclic structure formed by bonding the groups R are the same as the compounds represented by the formula (2).

Similar to $R^1$ of the compound represented by the formula (1), the two or more $R^1$ in the formula (2) are monovalent hydrocarbons having 1 to 20 carbon atoms, preferably 1 to 10 carbon atoms, more preferably 2 to 8 carbon atoms, further more preferably 4 to 8 carbon atoms, especially 4 to 6 carbon atoms. Examples of the hydrocarbon groups are ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Among them, in the viewpoint that olefin polymers having a wide molecular weight distribution can be easily produced, n-butyl group, isobutyl group, hexyl group and octyl group are preferred, and further n-butyl group and isobutyl group are particularly preferred.

As the ester compounds (B1), a cyclic ester compound (B1-a) and a cyclic ester compound (B1-b) having the following structure are preferably used.

[Cyclic Ester Compound (B1-a)]

The cyclic ester compound (B1-a) has two or more carboxylic acid ester groups and is represented by the following formula (2a).

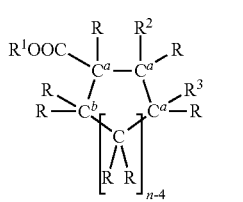

(2a)

In the formula (2a), n is an integer of 5 to 10, preferably to 7, especially 6. $C^a$ and $C^b$ represent carbon atoms.

$R^2$ and $R^3$ each are independently $COOR^1$ or R, and at least one of $R^2$ and $R^3$ is $COOR^1$.

All the bonds of carbon atoms in the cyclic structure are preferably single bonds, but any of single bonds except for $C^a$—$C^a$ bond and $C^a$—$C^b$ bond in the case that $R^3$ is R may be replaced with a double bond.

The two or more $R^1$ are monovalent hydrocarbons having 1 to 20 carbon atoms, preferably 1 to 10 carbon atoms, more preferably 2 to 8 carbon atoms, further more preferably 4 to 8 carbon atoms, especially 4 to 6 carbon atoms. Examples of the hydrocarbon groups are ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Among them, in the viewpoint that olefin polymers having a wide molecular weight distribution can be easily produced, n-butyl group, isobutyl group, hexyl group and octyl group are preferred, and further n-butyl group and isobutyl group are particularly preferred.

The two or more R each are independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, but at least one R is not a hydrogen atom.

As the two or more R except for a hydrogen atom, a hydrocarbon group having 1 to 20 carbon atoms is preferred among the above. Examples of the hydrocarbon group having 1 to 20 carbon atoms may include aliphatic hydrocarbon groups, alicyclic hydrocarbon groups and aromatic hydrocarbon groups such as methyl, ethyl, n-propyl, iso-propyl, n-butyl, iso-butyl, sec-butyl, n-pentyl, cyclopentyl, n-hexyl, cyclohexyl, vinyl, phenyl and octyl groups. Among the above, aliphatic hydrocarbon groups are preferred, and specifically methyl group, ethyl group, n-propyl group, iso-propyl group, n-butyl group, iso-butyl group and sec-butyl group are preferred.

Moreover, the two or more R may be bonded each other to form a ring. The skeleton of the ring formed by bonding of the two or more R may include a double bond. When the skeleton of the ring includes at least two $C^a$ bonded with $COOR^1$, the number of carbon atoms constituting the skeleton of the ring is 5 to 10.

Examples of the skeleton of such a ring are a norbornane skeleton, a tetracyclododecene skeleton, etc.

The two or more R' may be a carboxylic acid ester group, an alkoxy group, a siloxy group and carbonyl structure-containing groups such as an aldehyde group and an acetyl group. These substituents preferably contain at least one hydrocarbon group.

WO-A-2006/077945 pamphlet discloses these cyclic ester compounds (B1-a).

Examples thereof are:
3-methylcyclohexane-1,2-diethyl dicarboxylate,
3-methylcyclohexane-1,2-di-n-propyl dicarboxylate,
3-methylcyclohexane-1,2-diisopropyl dicarboxylate,
3-methylcyclohexane-1,2-di-n-butyl dicarboxylate,
3-methylcyclohexane-1,2-diisobutyl dicarboxylate,
3-methylcyclohexane-1,2-dihexyl dicarboxylate,
3-methylcyclohexane-1,2-diheptyl dicarboxylate,
3-methylcyclohexane-1,2-dioctyl dicarboxylate,
3-methylcyclohexane-1,2-di-2-ethylhexyl dicarboxylate,
3-methylcyclohexane-1,2-didecyl dicarboxylate,
4-methylcyclohexane-1,3-diethyl dicarboxylate,
4-methylcyclohexane-1,3-diisobutyl dicarboxylate,
4-methylcyclohexane-1,2-diethyl dicarboxylate,
4-methylcyclohexane-1,2-di-n-propyl dicarboxylate, 4-methylcyclohexane-1,2-diisopropyl dicarboxylate,
4-methylcyclohexane-1,2-di-n-butyl dicarboxylate,
4-methylcyclohexane-1,2-diisobutyl dicarboxylate,
4-methylcyclohexane-1,2-dihexyl dicarboxylate,
4-methylcyclohexane-1,2-diheptyl dicarboxylate,
4-methylcyclohexane-1,2-dioctyl dicarboxylate,
4-methylcyclohexane-1,2-di-2-ethylhexyl dicarboxylate,
4-methylcyclohexane-1,2-didecyl dicarboxylate,
5-methylcyclohexane-1,3-diethyl dicarboxylate,
5-methylcyclohexane-1,3-diisobutyl dicarboxylate,
3,4-dimethylcyclohexane-1,2-diethyl dicarboxylate,
3,4-dimethylcyclohexane-1,2-di-n-propyl dicarboxylate,
3,4-dimethylcyclohexane-1,2-diisopropyl dicarboxylate,
3,4-dimethylcyclohexane-1,2-di-n-butyl dicarboxylate,
3,4-dimethylcyclohexane-1,2-diisobutyl dicarboxylate,
3,4-dimethylcyclohexane-1,2-dihexyl dicarboxylate,
3,4-dimethylcyclohexane-1,2-diheptyl dicarboxylate,
3,4-dimethylcyclohexane-1,2-dioctyl dicarboxylate,
3,4-dimethylcyclohexane-1,2-di-2-ethylhexyl dicarboxylate,
3,4-dimethylcyclohexane-1,2-didecyl dicarboxylate,
3,6-dimethylcyclohexane-1,2-diethyl dicarboxylate,
3,6-dimethylcyclohexane-1,2-di-n-propyl dicarboxylate,
3,6-dimethylcyclohexane-1,2-diisopropyl dicarboxylate,
3,6-dimethylcyclohexane-1,2-di-n-butyl dicarboxylate,
3,6-dimethylcyclohexane-1,2-diisobutyl dicarboxylate,
3,6-dimethylcyclohexane-1,2-dihexyl dicarboxylate,
3,6-dimethylcyclohexane-1,2-diheptyl dicarboxylate,
3,6-dimethylcyclohexane-1,2-dioctyl dicarboxylate,
3,6-dimethylcyclohexane-1,2-di-2-ethylhexyl dicarboxylate,
3,6-dimethylcyclohexane-1,2-didecyl dicarboxylate,
3,6-diphenylcyclohexane-1,2-diethyl dicarboxylate,
3,6-diphenylcyclohexane-1,2-di-n-propyl dicarboxylate,
3,6-diphenylcyclohexane-1,2-diisopropyl dicarboxylate,
3,6-diphenylcyclohexane-1,2-di-n-butyl dicarboxylate,
3,6-diphenylcyclohexane-1,2-diisobutyl dicarboxylate,
3,6-diphenylcyclohexane-1,2-dihexyl dicarboxylate,
3,6-diphenylcyclohexane-1,2-dioctyl dicarboxylate,
3,6-diphenylcyclohexane-1,2-didecyl dicarboxylate,
3-methyl-6-ethylcyclohexane-1,2-diethyl dicarboxylate,
3-methyl-6-ethylcyclohexane-1,2-di-n-propyl dicarboxylate,
3-methyl-6-ethylcyclohexane-1,2-diisopropyl dicarboxylate,
3-methyl-6-ethylcyclohexane-1,2-di-n-butyl dicarboxylate,
3-methyl-6-ethylcyclohexane-1,2-diisobutyl dicarboxylate,
3-methyl-6-ethylcyclohexane-1,2-dihexyl dicarboxylate,
3-methyl-6-ethylcyclohexane-1,2-diheptyl dicarboxylate,
3-methyl-6-ethylcyclohexane-1,2-dioctyl dicarboxylate,
3-methyl-6-ethylcyclohexane-1,2-di-2-ethylhexyl dicarboxylate,
3-methyl-6-ethylcyclohexane-1,2-didecyl dicarboxylate,
3-methyl-6-n-propylcyclohexane-1,2-diethyl dicarboxylate,
3-methyl-6-n-propylcyclohexane-1,2-di-n-propyl dicarboxylate,
3-methyl-6-n-propylcyclohexane-1,2-diisopropyl dicarboxylate,
3-methyl-6-n-propylcyclohexane-1,2-di-n-butyl dicarboxylate,
3-methyl-6-n-propylcyclohexane-1,2-diisobutyl dicarboxylate,
3-methyl-6-n-propylcyclohexane-1,2-dihexyl dicarboxylate,
3-methyl-6-n-propylcyclohexane-1,2-diheptyl dicarboxylate,
3-methyl-6-n-propylcyclohexane-1,2-dioctyl dicarboxylate,
3-methyl-6-n-propylcyclohexane-1,2-di-2'-ethylhexyl dicarboxylate,
3-methyl-6-n-propylcyclohexane-1,2-didecyl dicarboxylate,
3-hexylcyclohexane-1,2-diethyl dicarboxylate,
3-hexylcyclohexane-1,2-diisobutyl dicarboxylate,
3,6-dihexylcyclohexane-1,2-diethyl dicarboxylate,
3-hexyl-6-pentylcyclohexane-1,2-diisobutyl dicarboxylate,
3-methylcyclopentane-1,2-diethyl dicarboxylate,
3-methylcyclopentane-1,2-diisobutyl dicarboxylate,
3-methylcyclopentane-1,2-diheptyl dicarboxylate,
3-methylcyclopentane-1,2-didecyl dicarboxylate,
4-methylcyclopentane-1,3-diethyl dicarboxylate,
4-methylcyclopentane-1,3-diisobutyl dicarboxylate,
4-methylcyclopentane-1,2-diethyl dicarboxylate,
4-methylcyclopentane-1,2-diisobutyl dicarboxylate,
4-methylcyclopentane-1,2-diheptyl dicarboxylate,
4-methylcyclopentane-1,2-didecyl dicarboxylate,
5-methylcyclopentane-1,3-diethyl dicarboxylate,
5-methylcyclopentane-1,3-diisobutyl dicarboxylate,
3,4-dimethylcyclopentane-1,2-diethyl dicarboxylate,
3,4-dimethylcyclopentane-1,2-diisobutyl dicarboxylate,
3,4-dimethylcyclopentane-1,2-diheptyl dicarboxylate,
3,4-dimethylcyclopentane-1,2-didecyl dicarboxylate,
3,5-dimethylcyclopentane-1,2-diethyl dicarboxylate,
3,5-dimethylcyclopentane-1,2-diisobutyl dicarboxylate,
3,5-dimethylcyclopentane-1,2-diheptyl dicarboxylate,
3,5-dimethylcyclopentane-1,2-didecyl dicarboxylate,
3-hexylcyclopentane-1,2-diethyl dicarboxylate,
3,5-dihexylcyclopentane-1,2-diethyl dicarboxylate,
3-hexyl-5-pentylcyclopentane-1,2-diisobutyl dicarboxylate,
3-methyl-5-n-propylcyclopentane-1,2-diethyl dicarboxylate,
3-methyl-5-n-propylcyclopentane-1,2-di-n-propyl dicarboxylate,
3-methyl-5-n-propylcyclopentane-1,2-diisopropyl dicarboxylate,
3-methyl-5-n-propylcyclopentane-1,2-di-n-butyl dicarboxylate,
3-methyl-5-n-propylcyclopentane-1,2-diisobutyl dicarboxylate,
3-methyl-5-n-propylcyclopentane-1,2-dihexyl dicarboxylate,
3-methyl-5-n-propylcyclopentane-1,2-dioctyl dicarboxylate,
3-methyl-5-n-propylcyclopentane-1,2-didecyl dicarboxylate,
3-methylcycloheptane-1,2-diethyl dicarboxylate,
3-methylcycloheptane-1,2-diisobutyl dicarboxylate,
3-methylcycloheptane-1,2-diheptyl dicarboxylate,
3-methylcycloheptane-1,2-didecyl dicarboxylate,
4-methylcycloheptane-1,3-diethyl dicarboxylate,
4-methylcycloheptane-1,3-diisobutyl dicarboxylate,
4-methylcycloheptane-1,2-diethyl dicarboxylate,
4-methylcycloheptane-1,2-diisobutyl dicarboxylate,
4-methylcycloheptane-1,2-diheptyl dicarboxylate,
4-methylcycloheptane-1,2-didecyl dicarboxylate,
5-methylcycloheptane-1,3-diethyl dicarboxylate,
5-methylcycloheptane-1,3-diisobutyl dicarboxylate,
3,4-dimethylcycloheptane-1,2-diethyl dicarboxylate,
3,4-dimethylcycloheptane-1,2-diisobutyl dicarboxylate,
3,4-dimethylcycloheptane-1,2-diheptyl dicarboxylate,
3,4-dimethylcycloheptane-1,2-didecyl dicarboxylate,
3,7-dimethylcycloheptane-1,2-diethyl dicarboxylate,
3,7-dimethylcycloheptane-1,2-diisobutyl dicarboxylate,
3,7-dimethylcycloheptane-1,2-diheptyl dicarboxylate,
3,7-dimethylcycloheptane-1,2-didecyl dicarboxylate,
3-hexylcycloheptane-1,2-diethyl dicarboxylate,
3,7-dihexylcycloheptane-1,2-diethyl dicarboxylate,
3-hexyl-7-pentylcycloheptane-1,2-diisobutyl dicarboxylate,
3-methyl-7-n-propylcycloheptane-1,2-diethyl dicarboxylate,
3-methyl-7-n-propylcycloheptane-1,2-di-n-propyl dicarboxylate,
3-methyl-7-n-propylcycloheptane-1,2-diisopropyl dicarboxylate,
3-methyl-7-n-propylcycloheptane-1,2-di-n-butyl dicarboxylate, 3-methyl-7-n-propylcycloheptane-1,2-diisobutyl dicarboxylate,
3-methyl-7-n-propylcycloheptane-1,2-dihexyl dicarboxylate,
3-methyl-7-n-propylcycloheptane-1,2-dioctyl dicarboxylate,
3-methyl-7-n-propylcycloheptane-1,2-didecyl dicarboxylate,
3-methylcyclooctane-1,2-diethyl dicarboxylate,
3-methylcyclodecane-1,2-diethyl dicarboxylate,
3-vinylcyclohexane-1,2-diisobutyl dicarboxylate,
3,6-diphenylcyclohexane-1,2-diisobutyl dicarboxylate,
3,6-dicyclohexylcyclohexane-1,2-diethyl dicarboxylate,
norbornane-2,3-diisobutyl dicarboxylate,
teracyclododecane-2,3-diisobutyl dicarboxylate,
3,6-dimethyl-4-cyclohexene-1,2-diethyl dicarboxylate,
3,6-dimethyl-4-cyclohexene-1,2-di-n-propyl dicarboxylate,
3,6-dimethyl-4-cyclohexene-1,2-diisopropyl dicarboxylate,
3,6-dimethyl-4-cyclohexene-1,2-di-n-butyl dicarboxylate,
3,6-dimethyl-4-cyclohexene-1,2-diisobutyl dicarboxylate,
3,6-dimethyl-4-cyclohexene-1,2-dihexyl dicarboxylate,
3,6-dimethyl-4-cyclohexene-1,2-diheptyl dicarboxylate,
3,6-dimethyl-4-cyclohexene-1,2-dioctyl dicarboxylate,
3,6-dimethyl-4-cyclohexene-1,2-di-2-ethylhexyl dicarboxylate,
3,6-dimethyl-4-cyclohexene-1,2-didecyl dicarboxylate,
3,6-dihexyl-4-cyclohexene-1,2-diethyl dicarboxylate and
3-hexyl-6-pentyl-4-cyclohexene-1,2-diisobutyl dicarboxylate.

In addition, dicarboxylic acid esters of the cyclic diol compounds corresponding to these compounds can be given as the preferable compounds. Preferable examples of the compounds may include:
3,6-dimethylcyclohexyl-1,2-diacetate,
3,6-dimethylcyclohexyl-1,2-dibutanate,
3-methyl-6-propylcyclohexyl-1,2-diolacetate,
3-methyl-6-propylcyclohexyl-1,2-dibutanate,
3,6-dimethylcyclohexyl-1,2-dibenzoate,
3,6-dimethylcyclohexyl-1,2-ditoluate,
3-methyl-6-propylcyclohexyl-1,2-dibenzoate and
3-methyl-6-propylcyclohexyl-1,2-ditoluate.

In the above compounds having the diester structure, isomers, for example, cis form, trans form, etc derived from two or more COOR¹ groups in the formula (2a) are present. Even if the compounds have any one of the structures, they have the effects of meeting the object of the present invention. However, they preferably have a higher content of the trans form. The compounds having a higher content of the trans form not only have an effect capable of extending the molecular weight distribution but also show tendencies such that the activities are high and resulting polymers have higher stereoregularity.

Preferable examples of the ester compound (B1-a) may include compounds represented by the following formulas (2-1) to (2-6).

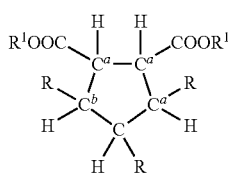
(2-1)

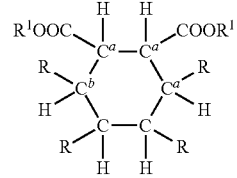
(2-2)

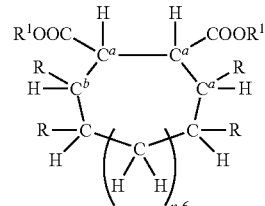
(2-3)

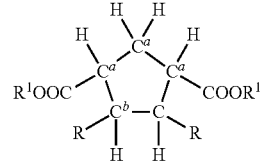
(2-4)

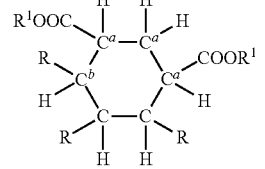
(2-5)

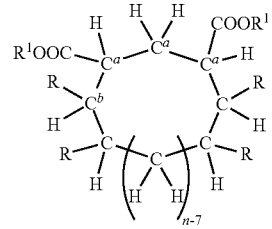
(2-6)

In the formulas (2-1) to (2-6), $R^1$ and R are the same as above.

In the formulas (2-1) to (2-3), the single bonds in the cyclic skeletons excluding $C^a$—$C^a$ bond and $C^a$—$C^b$ bond may be replaced with double bonds.

In the formulas (2-4) to (2-6), the single bonds excluding $C^a$—$C^a$ bond may be replaced with double bonds.

Moreover, in the formulas (2-3) and (2-6), n is an integer of 7 to 10.

Preferable examples of the cyclic ester compounds (B1-a) are compounds represented by the following formula (2b).

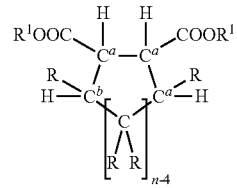
(2b)

In the formula (2b), n, $R^1$ and R are the same as above, namely the same as the definition in the formula (2a), and the single bonds in the cyclic skeletons excluding $C^a$—$C^a$ bond and $C^a$—$C^b$ bond may be replaced with double bonds.

Specific examples of the compounds represented by the formula (2b) are:
3,6-dimethylcyclohexane-1,2-diisobutyl dicarboxylate,
3,6-dimethylcyclohexane-1,2-di-n-hexyl dicarboxylate,
3,6-dimethylcyclohexane-1,2-di-n-octyl dicarboxylate,
3-methyl-6-ethylcyclohexane-1,2-diisobutyl dicarboxylate,
3-methyl-6-ethylcyclohexane-1,2-di-n-hexyl dicarboxylate,
3-methyl-6-ethylcyclohexane-1,2-di-n-octyl dicarboxylate,
3-methyl-6-n-propylcyclohexane-1,2-diisobutyl dicarboxylate,
3-methyl-6-n-propylcyclohexane-1,2-di-n-hexyl dicarboxylate,
3-methyl-6-n-propylcyclohexane-1,2-di-n-octyl dicarboxylate,
3,6-diethylcyclohexane-1,2-diisobutyl dicarboxylate,
3,6-diethylcyclohexane-1,2-di-n-hexyl dicarboxylate,
3,6-diethylcyclohexane-1,2-di-n-octyl dicarboxylate,
3,5-dimethylcyclopentane-1,2-diisobutyl dicarboxylate,
3,5-dimethylcyclopentane-1,2-di-n-hexyl dicarboxylate,
3,5-dimethylcyclopentane-1,2-di-n-octyl dicarboxylate,
3-methyl-5-ethylcyclopentane-1,2-diisobutyl dicarboxylate,
3-methyl-5-ethylcyclopentane-1,2-di-n-hexyl dicarboxylate,
3-methyl-5-ethylcyclopentane-1,2-di-n-octyl dicarboxylate,
3-methyl-5-n-propylcyclopentane-1,2-di-n-hexyl dicarboxylate,
3-methyl-5-n-propylcyclopentane-1,2-di-n-octyl dicarboxylate,
3,5-diethylcyclopentane-1,2-diisobutyl dicarboxylate,
3,5-diethylcyclopentane-1,2-di-n-hexyl dicarboxylate,
3,5-diethylcyclopentane-1,2-di-n-octyl dicarboxylate,
3,7-dimethylcycloheptane-1,2-diisobutyl dicarboxylate,
3,7-dimethylcycloheptane-1,2-di-n-hexyl dicarboxylate,
3,7-dimethylcycloheptane-1,2-di-n-octyl dicarboxylate,
3-methyl-7-ethylcycloheptane-1,2-diisobutyl dicarboxylate,
3-methyl-7-ethylcycloheptane-1,2-di-n-hexyl dicarboxylate,
3-methyl-7-ethylcycloheptane-1,2-di-n-octyl dicarboxylate,
3-methyl-7-n-propylcycloheptane-1,2-di-n-hexyl dicarboxylate,
3-methyl-7-n-propylcycloheptane-1,2-di-n-octyl dicarboxylate,
3,7-diethylcyclopentane-1,2-diisobutyl dicarboxylate,
3,7-diethylcyclopentane-1,2-di-n-hexyl dicarboxylate and
3,7-diethylcyclopentane-1,2-di-n-octyl dicarboxylate.

Among the above compounds, more preferred are:
3,6-dimethylcyclohexane-1,2-diisobutyl dicarboxylate,
3,6-dimethylcyclohexane-1,2-di-n-hexyl dicarboxylate,
3,6-dimethylcyclohexane-1,2-di-n-octyl dicarboxylate,
3-methyl-6-ethylcyclohexane-1,2-diisobutyl dicarboxylate,
3-methyl-6-ethylcyclohexane-1,2-di-n-hexyl dicarboxylate,
3-methyl-6-ethylcyclohexane-1,2-di-n-octyl dicarboxylate,
3-methyl-6-n-propylcyclohexane-1,2-diisobutyl dicarboxylate,
3-methyl-6-n-propylcyclohexane-1,2-di-n-hexyl dicarboxylate,
3-methyl-6-n-propylcyclohexane-1,2-di-n-octyl dicarboxylate,
3,6-diethylcyclohexane-1,2-diisobutyl dicarboxylate,
3,6-diethylcyclohexane-1,2-di-n-hexyl dicarboxylate and
3,6-diethylcyclohexane-1,2-di-n-octyl dicarboxylate.

These compounds can be produced utilizing Diels Alder reaction but have a tendency that the production cost is rather higher as compared with conventional electron donor compounds because polyene compounds, which are raw materials of these compounds, are relatively expensive.

In the cyclic ester compounds (B1-a) having the diester structures, isomers, for example, cis form, trans form, etc are present. Even if the compounds have any one of the structures, they have the effects of meeting the object of the present invention. However, they preferably have a higher content of the trans form. The compounds having a higher content of the trans form not only have an effect capable of extending the molecular weight distribution but also show tendencies such that the activities are high and resulting polymers have higher stereoregularity. Of the cis form and the trans form, the proportion of the trans form is preferably not less than 51%. The lower limit is preferably 55%, more preferably 60%, especially 65%. On the other hand, the upper limit is preferably 100%, more preferably 90%, furthermore preferably 85%, especially 79%.

[Cyclic Ester Compound (B1-b)]

The cyclic ester compound (B1-b) has two or more carboxylic acid ester groups and is represented by the following formula (2c).

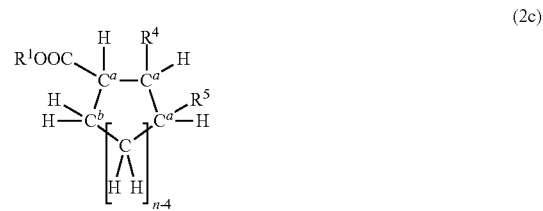

(2c)

In the formula (2c), n is an integer of 5 to 10, preferably 5 to 7, especially 6. Furthermore, $C^a$ and $C^b$ are carbon atoms.

All the carbon atom bonds in the cyclic skeleton are preferably single bonds. However, any single bonds in the cyclic skeleton excluding $C^a$—$C^a$ bond and $C^a$—$C^b$ bond in the case that $R^5$ is a hydrogen atom, may be replaced with double bonds.

$R^4$ and $R^5$ each are independently $COOR^1$ or a hydrogen atom, at least one of $R^4$ and $R^5$ is $COOR^1$ and the groups $R^1$ are independently a monovalent hydrocarbon group having 1 to 20 carbon atoms.

The two or more $R^1$ each are independently a monovalent hydrocarbon group having 1 to 20 carbon atoms, preferably 1 to 10 carbon atoms, more preferably 2 to 8 carbon atoms, furthermore preferably 4 to 8 carbon atoms, especially 4 to 6 carbon atoms. Examples of the hydrocarbon groups are ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Among them, n-butyl group, isobutyl group, hexyl group, octyl group are preferred, and further n-butyl group and isobutyl group are preferred because olefin polymers having a wide molecular weight distribution can be prepared.

Examples of the cyclic ester compound (B1-b) are:
cyclohexane-1,2-diethyl dicarboxylate,
cyclohexane-1,2-di-n-propyl dicarboxylate,
cyclohexane-1,2-diisopropyl dicarboxylate,
cyclohexane-1,2-di-n-butyl dicarboxylate,
cyclohexane-1,2-diisobutyl dicarboxylate,
cyclohexane-1,2-dihexyl dicarboxylate,
cyclohexane-1,2-diheptyl dicarboxylate,
cyclohexane-1,2-dioctyl dicarboxylate,
cyclohexane-1,2-di-2-ethylhexyl dicarboxylate,
cyclohexane-1,2-didecyl dicarboxylate,
cyclohexane-1,3-diethyl dicarboxylate, cyclohexane-1,3-diisobutyl dicarboxylate,
cyclopentane-1,2-diethyl dicarboxylate,
cyclopentane-1,2-diisopropyl dicarboxylate,
cyclopentane-1,2-diisobutyl dicarboxylate,
cyclopentane-1,2-diheptyl dicarboxylate,
cyclopentane-1,2-didecyl dicarboxylate,
cyclopentane-1,3-diethyl dicarboxylate,
cyclopentane-1,3-diisobutyl dicarboxylate,
cycloheptane-1,2-diethyl dicarboxylate,
cycloheptane-1,2-diisopropyl dicarboxylate,
cycloheptane-1,2-diisobutyl dicarboxylate,
cycloheptane-1,2-diheptyl dicarboxylate,
cycloheptane-1,2-didecyl dicarboxylate,
cycloheptane-1,3-diethyl dicarboxylate,
cycloheptane-1,3-diisobutyl dicarboxylate,
cyclooctane-1,2-diethyl dicarboxylate,
cyclodecane-1,2-diethyl dicarboxylate,
4-cyclohexene-1,2-diethyl dicarboxylate,
4-cyclohexene-1,2-di-n-propyl dicarboxylate,
4-cyclohexene-1,2-diisopropyl dicarboxylate,
4-cyclohexene-1,2-di-n-butyl dicarboxylate,
4-cyclohexene-1,2-diisobutyl dicarboxylate,
4-cyclohexene-1,2-dihexyl dicarboxylate,
4-cyclohexene-1,2-diheptyl dicarboxylate,
4-cyclohexene-1,2-dioctyl dicarboxylate,
4-cyclohexene-1,2-didecyl dicarboxylate,
4-cyclohexene-1,3-diethyl dicarboxylate,
4-cyclohexene-1,3-diisobutyl dicarboxylate,
3-cyclopentene-1,2-diethyl dicarboxylate,
3-cyclopentene-1,2-diisopropyl dicarboxylate,
3-cyclopentene-1,2-diisobutyl dicarboxylate,
3-cyclopentene-1,2-diheptyl dicarboxylate,
3-cyclopentene-1,2-didecyl dicarboxylate,
3-cyclopentene-1,3-diethyl dicarboxylate,
3-cyclopentene-1,3-diisobutyl dicarboxylate,
4-cycloheptene-1,2-diethyl dicarboxylate,
4-cycloheptene-1,2-diisopropyl dicarboxylate,
4-cycloheptene-1,2-diisobutyl dicarboxylate,
4-cycloheptene-1,2-diheptyl dicarboxylate,
4-cycloheptene-1,2-didecyl dicarboxylate,
4-cycloheptene-1,3-diethyl dicarboxylate,
4-cycloheptene-1,3-diisobutyl dicarboxylate,
5-cyclooctene-1,2-diethyl dicarboxylate and
6-cyclodecene-1,2-diethyl dicarboxylate.

In addition, dicarboxylic acid esters of cyclic diol compounds corresponding to these compounds can be exemplified as the preferable compounds. Examples of the compounds are cyclohexyl-1,2-diacetate, cyclohexyl-1,2-dibutanate, cyclohexyl-1,2-dibenzoate and cyclohexyl-1,2-ditoluate.

In the above compounds having the diester structure, isomers, for example, cis form, trans form, etc are present. Even if the compounds have any one of the structures, they have the effects of meeting the object of the present invention.

Of the cis form and the trans form, the proportion of the trans form is preferably not less than 51%. The lower limit is preferably 55%, more preferably 60%, especially 65%. On the other hand, the upper limit is preferably 100%, more preferably 90%, furthermore preferably 85%, especially 79%. The reason why the cyclic ester compounds having a trans form proportion in the above range are preferred is not clear. It is presumed that the variation of the stereoisomers as described later lies in the range suitable for making a wide molecular weight distribution.

Particularly, cyclohexane-1,2-diester dicarboxylate represented by the formula (2c) wherein n=6 has a trans form purity in the above range.

When the trans form purity is less than 51%, the effect of making a wide molecular weight distribution, activity, stereospecificity and other effects are sometimes insufficient. In addition, the trans form purity is over 79%, the effect of making a wide molecular weight distribution is sometimes insufficient. That is to say, the trans form purity in the above range is frequently advantageous for attaining a wide molecular weight distribution of a resulting polymer as well as higher catalyst activity and higher stereoregularity of a resulting polymer.

As the cyclic ester compound (B1-b), compounds having a cycloalkane-1,2-diester dicarboxylate structure represented by the following formula (2d) are preferred.

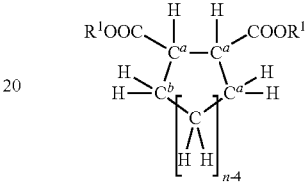

(2d)

In the formula (2d), n and $R^1$ are the same as above, namely the same as the definition in the formula (2c), single bonds in the cyclic skeleton excluding $C^a$—$C^a$ bond and $C^a$—$C^b$ bond may be replaced with double bonds.

Particularly, preferable examples are:
cyclohexane-1,2-di-n-butyl dicarboxylate,
cyclohexane-1,2-diisobutyl dicarboxylate,
cyclohexane-1,2-dihexyl dicarboxylate,
cyclohexane-1,2-diheptyl dicarboxylate,
cyclohexane-1,2-dioctyl dicarboxylate,
cyclohexane-1,2-di-2-ethylhexyl dicarboxylate,
cyclopentane-1,2-diisobutyl dicarboxylate,
cyclopentane-1,2-diheptyl dicarboxylate,
cycloheptane-1,2-diisobutyl dicarboxylate and
cycloheptane-1,2-diheptyl dicarboxylate.

Of the above compounds, more preferred are: cyclohexane-1,2-diisobutyl dicarboxylate, cyclohexane-1,2-dihexyl dicarboxylate, cyclohexane-1,2-diheptyl dicarboxylate, cyclohexane-1,2-dioctyl dicarboxylate and cyclohexane-1,2-di-2-ethylhexyl dicarboxylate. For the reasons, not only the catalyst performance is good but also these compounds can be produced utilizing Diels Alder reaction at a relatively low cost.

These compounds each may be used singly, or two or more may be used in combination. Moreover, the cyclic ester compounds (B1-a) and (B1-b) may be used in combination as far as the object of the present invention is not missed.

The molar ratio of the combination of the cyclic ester compounds (B1-a) and (B1-b) (the cyclic ester compound (B1-a)/(the cyclic ester compound (B1-a)+the cyclic ester compound (B1-b))×100 (% by mole)) is preferably not less than 10% by mole, more preferably not less than 30% by mole, furthermore preferably not less than 40% by mole, especially not less than 50% by mole. The upper limit is preferably 99% by mole, more preferably 90% by mole, furthermore preferably 85% by mole, especially 80% by mole.

The cyclic ester compounds (B1-a) and (B1-b) may be produced in the course of preparing the solid titanium catalyst component (I). For example, in the preparation of the solid titanium catalyst component (I), the cyclic ester compounds (B1-a) and (B1-b) can be contained in the solid titanium catalyst component by providing a step that carboxylic anhydride and carboxylic acid dihalide corresponding to the cyclic ester compounds (B1-a) and (B1-b) is substantially contacted with corresponding alcohol.

[Liquid Titanium Compound (C)]

As the liquid titanium compound (C) used in the preparation of the solid titanium catalyst component (I) according to the present invention, the titanium compounds described in, for example, JP-A-S58 (1983)-83006 and JP-A-S56 (1981)-811 (Patent documents 1 and 2) can be exemplified. Specific examples thereof are tetravalent titanium compounds represented by the following formula,

Ti(OR)$_g$X$_{4-g}$ in which R is a hydrocarbon group, X is a halogen atom and 0≤g≤4. More specific examples thereof are:

tetrahalogenated titaniums such as TiCl$_4$ and TiBr$_4$;

trihalogenated alkoxytitaniums such as Ti(OCH$_3$)Cl$_3$, Ti(OC$_2$H$_5$)Cl$_3$, Ti(On-C$_4$H$_9$)Cl$_3$, Ti(OC$_2$H$_5$)Br$_3$ and Ti(O$_{iso}$—C$_4$H$_9$)Br$_3$;

dihalogenated alkoxytitaniums such as Ti(OCH$_3$)$_2$Cl$_2$ and Ti(OC$_2$H$_5$)$_2$Cl$_2$;

monohalogenated alkoxytitaniums such as Ti(OCH$_3$)$_3$Cl, Ti(On-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_4$, Ti(OC$_4$H$_9$)$_4$ and Ti(O2-ethylhexyl)$_4$.

Among them, tetrahalogenated titaniums are preferred and, further, titanium tetrachloride is particularly preferred. These titanium compounds may be used singly or two or more may be used in combination.

[Electron Donor (D)]

In the preparation of the solid titanium catalyst component (I) according to the present invention, an electron donor (D) may be used in addition to the above ester compound (B). Examples of the electron donor (D) may include the following acid halides, acid amides, nitriles, acid anhydrides, organic acid esters and polyethers.

Specific examples are:

acid halides having 2 to 15 carbon atoms such as acetylchloride, benzoylchloride, toluic acid chloride and anisic acid chloride;

acid amides such as acetic acid N,N-dimethylamide, benzoic acid N,N-diethylamide and toluoylic acid N,N-dimethylamide;

nitriles such as acetonitrile, benzonitrile and trinitrile;

acid anhydrides such as acetic anhydride, phthalic anhydride and benzoic anhydride; and organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, chloromethyl acetate, dichloroethyl acetate, methyl methacrylate, ethyl crotonate, methyl benzoate, ethyl benzoate, propyl benzoate, butyl benzoate, octyl benzoate, cyclohexyl benzoate, phenyl benzoate, benzyl benzoate, methyl toluoylate, ethyl toluoylate, amyl toluoylate, ethyl ethylbenzoate, methyl anisate, ethyl anisate, ethyl ethoxybenzoate, γ-butyrolactone, δ-valerolactone, coumalin, phthalide and ethyl carbonate. Moreover, examples of the organic esters may include conventionally known polyvalent carboxylic acid esters.

Examples of polyvalent carboxylic acid esters are:

aliphatic polycarboxylic acid esters such as diethyl succinate, dibutyl succinate, diethyl methylmalonate, diethyl ethyl malonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, bis (2-ethylhexyl) fumarate, diethyl itaconate and dioctyl citraconate;

aromatic polycarboxylic acid esters such as monoethyl phthalate, dimethyl phthalate, methylethyl phthalate, monoisobutyl phthalate, diethyl phthalate, ethylisobutyl phthalate, di n-propyl phthalate, diisopropyl phthalate, di n-butyl phthalate, diisobutyl phthalate, di n-heptyl phthalate, di-2-ethylhexyl phthalate, di-n-octyl phthalate, dineopentyl phthalate, didecyl phthalate, benzylbutyl phthalate, diphenyl phthalate, diethyl naphthalene dicarboxylate, dibutyl naphthalene dicaroxylate, triethyl trimellitate, dibutyl trimellitate; and heterocyclic polycarboxylic acid esters such as 3,4-furane dicarboxylate etc. Among them, there is sometimes a case that the use of the polyfunctional aromatic compounds is preferably avoided or minimized from reasons of safety and sanitation.

Further examples of the polyvalent carboxylic acid esters may include long chain dicarboxylic acid esters such as diethyl adipate, diisobutyl adipate, diisopropyl sebacate, di n-butyl sebacate, di n-octyl sebacate and di-2-ethylhexyl sebacate.

Moreover, examples of the electron donor (D) may include compounds having two or more ether bonds present through two or more atoms (hereinafter sometimes referred to "polyether"). Examples of the polyethers are compounds such that two or more atoms present between ether bonds are selected from carbon, silicon, oxygen, nitrogen, sulfur, phosphorus and boron. Of these, preferable examples are compounds such that the atoms present between ether bonds are bonded with relatively bulky substituents and the atoms present between two or more ether bonds contain two or more carbon atoms. For example, polyether compounds represented by the following formula are preferred.

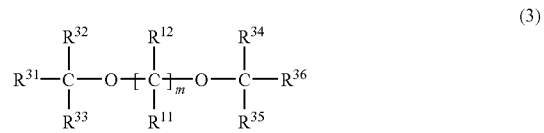

(3)

In the formula (3), m is an integer satisfying 1≤m≤10, preferably 3≤m≤10, R$^{11}$, R$^{12}$ and R$^{31}$ to R$^{36}$ each are independently a hydrogen atom or a substituent having at least one atom selected from carbon, hydrogen, oxygen, fluorine, chlorine, bromine, iodine, nitrogen, sulfur, phosphorus, boron and silicon.

Any of R$^{11}$, R$^{12}$ and R$^{31}$ to R$^{36}$, preferably R$^{11}$ and R$^{12}$ may form a ring other than benzene ring in combination and atoms other than carbon may be contained in the main chain.

Specific examples of the compounds having two or more ether bonds are:
2,2-dicyclohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2-methyl-2-propyl-1,3-dimethoxypropane,
2-methyl-2-ethyl-1,3-dimethoxypropane,
2-methyl-2-isopropyl-1,3-dimethoxypropane,
2-methyl-2-cyclohexyl-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylmethyl)-1,3-dimethoxypropane,
2,2-diisobutyl-1,3-dimethoxypropane, 2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2,2-di-s-butyl-1,3-dimethoxypropane,
2,2-di-t-butyl-1,3-dimethoxypropane.
2,2-dineopentyl-1,3-dimethoxypropane,
2-isopropyl-2-isopentyl-1,3-dimethoxypropane,
2-cyclohexyl-2-cyclohexylmethyl-1,3-dimethoxypropane,
2,3-dicyclohexyl-1,4-diethoxybutane,
2,3-diisopropyl-1,4-diethoxybutane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofurane,
3-methoxymethyldioxane,
1,2-diisobutoxypropane,
1,2-diisobutoxyethane,
1,3-diisoamyloxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane and
2-isobutyl-2-ethoxymethyl-1,3-dimethoxycyclohexane.

Of these, 1,3-diethers are preferred, and particularly, 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

In the present invention, the polyether compounds are preferably used as the electron donor (D). Two or more of the above electron donors (D) may be used in combination. In the present invention, the above electron donor (D) may be contained in the resulting solid titanium catalyst component. Therefore, other compounds capable of generating these compounds in the course of preparing the solid titanium catalyst component may be used. In this case, it is also possible to use the other compounds so as to generate two or more electron donors.

[Preparation of Solid Titanium Catalyst Component (I)]

As the process for preparing the solid titanium catalyst component (I) according to the present invention, it is possible to employ known processes capable of preparing the solid titanium catalyst component by allowing the magnesium compound in a liquid state to contact with the titanium compound in a liquid state without limitations as far as the process essentially include a step of using the ester compound (B) as the electron donor and allowing the magnesium compound (A) in a liquid state to contact with the ester compound (B) prior to the liquid titanium compound (C) or simultaneously with the ester compound (B) and the liquid titanium compound (C). That is to say, the magnesium compound (A) is contacted with the titanium compound (C) in the presence of the ester compound (B). Moreover, it is more preferred to allowing the magnesium compound (A) having no reducing ability in a liquid state to contact with the ester compound (B) prior to the liquid titanium compound (C) and then to contact with the ester compound (B1) which is the same as or different from the ester compound (B). Examples of these procedures may include the following methods (P-1) to (P-9).

(P-1) A method of depositing a solid titanium composite by allowing a mixture of the magnesium compound (A) having no reducing ability in a liquid state and the ester compound (B) to contact with the liquid titanium compound (C).

(P-2) A method of depositing a solid titanium composite by allowing a mixture of the magnesium compound (A) having no reducing ability in a liquid state and the ester compound (B) to react with the liquid titanium compound (C), and thereafter to dividedly contact with the liquid titanium compound (C) several times.

(P-3) A method of depositing a solid titanium composite by allowing the magnesium compound (A) having no reducing ability in a liquid state to contact with the ester compound (B) and the liquid titanium compound (C) simultaneously. In this procedure, the electron donor (D) may be contacted in an arbitrary step according to requirements.

(P-4) A method of depositing a solid titanium composite by allowing a mixture of the magnesium compound (A) having no reducing ability in a liquid state and the ester compound (B) to contact with the liquid titanium compound (C), and thereafter to contact with the ester compound (B) and the electron donor (D) according to requirements. In this procedure, the liquid titanium compound (C) may be dividedly contacted several times.

(P-5) A method of depositing a solid titanium composite by allowing the magnesium compound (A) having no reducing ability in a liquid state to contact with a mixture or a contactant of the ester compound (B) and the liquid titanium compound (C). In this procedure, the electron donor (D) may be contacted in an arbitrary step according to requirements and the titanium compound (C) in a liquid state may be dividedly contacted several times.

(P-6) A method of allowing a mixture of the magnesium compound (A) having no reducing ability in a liquid state and the ester compound (B) to contact with the liquid titanium compound (C) to deposit a solid titanium composite and thereafter allowing the composite to contact with the ester compound (B1). In this procedure, the liquid titanium compound (C) may be dividedly contacted several times.

(P-7) A method of allowing a mixture of the magnesium compound (A) having no reducing ability in a liquid state and the ester compound (B) to contact with the liquid titanium compound (C) to deposit a solid titanium composite and thereafter allowing the composite to contact with the ester compound (B1) and further to contact with the titanium compound (C) in a liquid state.

(P-8) A method of allowing a mixture of the magnesium compound (A) having no reducing ability in a liquid state and the ester compound (B) to contact with the liquid titanium compound (C) to deposit a solid titanium composite and thereafter allowing the composite to contact with the ester compound (B1) and the electron donor (D) according to requirements. In this procedure, the liquid titanium compound (C) may be dividedly contacted several times.

(P-9) A method of allowing a mixture of the magnesium compound (A) having no reducing ability in a liquid state and the ester compound (B) to contact with the liquid titanium compound (C) to deposit a solid titanium composite and thereafter allowing the composite to contact with the ester compound (B1) and the electron donor (D) according to requirements and further to contact with the liquid titanium compound (C).

Of these methods, it is preferred to employ the method of using a liquid prepared by mixing the magnesium compound (A) and the ester compound (B) previously. Moreover, it is preferred to contact with the ester compound (B1) after contacting with the liquid titanium compound (C). That is to say, the ester compound (B1) is preferably contacted in the presence of the liquid titanium compound (C).

The method of mixing the magnesium compound (A) and the liquid titanium compound (C) and then contacting with the ester compound (B) has a tendency for being difficult to enlarge the particle diameter.

In the above method, the magnesium compound (A), the ester compound (B) and the titanium compound (C) are reacted to form a solid titanium catalyst component having olefin polymerization performance and simultaneously to prepare a solid titanium catalyst component having an average particle diameter of 1 to 50 μm, namely having a very wide particle diameter range due to particle aggregation. For producing a solid titanium catalyst component having a large particle diameter, a step of producing a carrier or a magnesium compound having a large particle diameter is generally required in many cases. The productions of the above carrier and the magnesium compound frequently need special facilities and lead to a factor of increasing the fixed cost thereof. Meanwhile the method of allowing the magnesium compound (A) in a liquid state to contact with the titanium compound (C) in a liquid state can decrease the production cost because particle aggregation simultaneously proceeds during the reaction and thereby the production facilities of the carrier etc are substantially unnecessary.

It has been said that in conventional methods, it is difficult to enlarge the diameters of the particles and the upper limit of an average particle diameter is about 20 μm. In the meantime, according to the present invention, it is astonishing that the solid titanium catalyst component having a large particle diameter, namely having an average particle diameter of not less than 30 μm can be prepared without marring the efficiency and the stereospecificity. To be sure it is also possible to prepare ones having a conventional average particle diameter of not more than 20 μm.

The lower limit of the average particle diameter of the solid titanium catalyst component (I) according to the present invention is preferably 5 μm, more preferably 8 μm, especially 10 μm, and the upper limit is preferably 45 μm, especially 40 μm.

The solid titanium catalyst component (I) of the present invention has an atomic ratio of halogen to titanium of 2 to 100, preferably 4 to 90, and an atomic ratio of magnesium to titanium of 2 to 100, preferably 4 to 50. The molar ratio of the ester compound (B) to titanium is 0 to 100, preferably 0.01 to 10. Moreover, the ingredients, which may be contained in the component (I), such as the electron donor (D) etc are used in such an amount that the molar ratio of the electron donor (D) to titanium is 0.01 to 100, preferably 0.2 to 10. When two kinds of the ester compound (B) and the ester compound (B1) are used, the molar ratio of the ester compounds (B) and (B1) to titanium is 0 to 100, preferably 0.01 to 10, and any of the molar ratio of the ester compound (B) to titanium and the molar ratio of the ester compound (B1) to titanium is 0 to 100, preferably 0.01 to 10.

As the specific conditions for preparing the solid titanium catalyst component (I), the conditions as described in, for example, JP-A-S58 (1983)-83006 and JP-A-S56 (1981)-811 (Patent documents 1 and 2) can be preferably employed except that the ester compound (B) is used as an electron donor and the step of allowing the compound (B) to contact with the magnesium compound in a liquid state is essential for the preparation thereof.

[Olefin Polymerization Catalyst]

The olefin polymerization catalyst of the present invention comprises the solid titanium catalyst component (I) thus prepared and preferably comprises the organometallic compound catalyst component (II) containing a metal selected from Groups 1 and 2 and 13 in the Periodic Table. Examples of such an organometallic compound catalyst component (II) may include an organoaluminum compound, an alkylated complex of a Group 1 metal and aluminum and an organometallic compound of a Group 2 metal. Among them, the organoaluminum compound is preferred.

Preferable examples of the organometallic compound catalyst component (II) may include known organometallic compound catalyst components as described in EP585869A1 etc.

Furthermore, the olefin polymerization catalyst of the present invention comprises the electron donor (III) according to requirements together with the above organometallic compound catalyst component (II). An organosilicon compound is preferable as the electron donor (III). Examples of the organosilicon compound may include compounds represented by the following formula.

In the formula, R and R' are hydrocarbon groups and 0<n<4. Specific examples of the organosilicon compound represented by the above formula are diisopropyl dimethoxysilane, t-butylmethyl dimethoxysilane, t-butylmethyl diethoxysilane, t-amylmethyl diethoxysilane, dicyclohexyl dimethoxysilane, cyclohexylmethyl dimethoxysilane, cyclohexylmethyl diethoxysilane, vinyltrimethoxysilane, vinyltriethoxysilane, t-butyl triethoxysilane, phenyl triethoxysilane, cyclohexyltrimethoxysilane, cyclopentyl trimethoxysilane, 2-methyl cyclopentyl trimethoxysilane, cyclopentyl triethoxysilane, dicyclopentyl dimethoxysilane, dicyclopentyl diethoxysilane, tricyclopentylmethoxysilane, dicyclopentyl methylmethoxysilane, dicyclopentyl ethylmethoxysilane and cyclopentyl dimethylethoxysilane.

Among them, it is preferred to use vinyltriethoxysilane, diphenyl dimethoxysilane, dicyclohexyl dimethoxysilane, cyclohexylmethyl dimethoxysilane and dicyclopentyl dimethoxysilane. Two or more of these organosilicon compounds can be also mixed and submitted to use.

In addition, the electron donor (D) used for the solid titanium catalyst component may be exemplified. A preferable example thereof is known polyether, which is described as an example thereof.

In the present invention, the olefin polymerization catalyst still can contain other components useful for the olefin polymerization according to requirements in addition to the above ingredients. For example, described are an antistatic agent, a particle flocculating agent and a storage stabilizer.

[Olefin Polymerization Process]

The olefin polymerization process of the present invention is characterized by carrying out the olefin polymerization using the olefin polymerization catalyst of the present invention.

In the olefin polymerization process of the present invention, the polymerization can be carried out in the presence of a prepolymerization catalyst obtainable by carrying out prepolymerization of an olefin in the presence of the olefin polymerization catalyst of the present invention. The prepolymerization is carried out by prepolymerizing an olefin in an amount of 0.1 to 1000 g, preferably 0.3 to 500 g, more preferably 1 to 200 g per 1 g of the olefin polymerization catalyst.

In the prepolymerization, it is possible to use the catalyst having a concentration higher than the catalyst concentration in the system of the polymerization. The solid titanium catalyst component (I) in the prepolymerization has a concentration in terms of titanium atom of usually about 0.001 to 200 mmol, preferably about 0.01 to 50 mmol, more preferably about 0.1 to 20 mmol per 1 l of the liquid medium.

In the prepolymerization, the organometallic compound catalyst component (II) is used in an amount such that a polymer can be produced in an amount of 0.1 to 1000 g, preferably 0.3 to 500 g per 1 g of the solid titanium catalyst component (I). It is desired that the organometallic compound catalyst component (II) is used in an amount of usually about 0.1 to 300 mol, preferably about 0.5 to 100 mol, more preferably 1 to 50 mol per 1 mol of titanium atom in the solid titanium catalyst component (I).

In the prepolymerization, it is also possible to use the electron donor (III) etc according to requirements. In this case, these components are used in an amount of usually about 0.1 to 50 mol, preferably about 0.5 to 30 mol, more preferably 1 to 10 mol per 1 mol of titanium atom in the solid titanium catalyst component (I).

The prepolymerization can be carried out by adding an olefin and the above catalyst components to the inert hydrocarbon medium under mild conditions. In this prepolymerization, examples of the inert hydrocarbon medium are:

aliphatic hydrocarbons such as propane, butane, heptane, octane, decane, dodecane and kerosene;

alicyclic hydrocarbons such as cycloheptane, methylcycloheptane;

aromatic hydrocarbons such as benzene, toluene and xylene;

halogenated hydrocarbons such as ethylene chloride and chlorobenzene; and mixtures thereof.

Of these inert hydrocarbon mediums, it is preferred to use aliphatic hydrocarbons. The prepolymerization can be carried out continuously using the olefin itself as the solvent. However, when the inert hydrocarbon medium is used, the prepolymerization is preferably carried out batchwise.

Meanwhile, the prepolymerization may be carried out using the olefin itself as the solvent, or may be carried out in substantially no solvent. In this case, the prepolymerization is preferably carried out continuously.

The olefin used in the prepolymerization is the same as or different from the olefin used in the polymerization described later. Specifically, propylene is preferred. The temperature in the prepolymerization is usually from about −20 to +100° C., preferably about −20 to +80° C., more preferably 0 to +40° C.

Next, the polymerization, which is carried out after the prepolymerization or by no way of the prepolymerization, is described.

Examples of the olefin usable in the polymerization may include ethylene and α-olefins having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Furthermore, propylene, 1-butene, 1-pentene and 4-methyl-1-pentene are preferably used. In addition to the olefins, it is also possible to use aromatic vinyl compounds such as styrene and allylbenzene; and alicyclic vinyl compounds such as vinylcycloheptane etc. Moreover, two or more of these compounds may be used in combination. Besides, together with ethylene and α-olefins, it is also possible to use polyunsaturated compounds such as conjugated dienes or non-conjugated dienes such as cyclopentene, cycloheptene, norbornene, tetracyclododecene, isoprene or butadiene, as a polymerization raw material.

In the present invention, the prepolymerization and the polymerization can be carried out in any of a liquid phase polymerization such as solution polymerization or suspension polymerization and a gas phase polymerization.

When the polymerization is carried out by slurry polymerization, it is possible to use, as a reaction solvent, the inert hydrocarbons used in the above described prepolymerization, or an olefin which is in a liquid state at a reaction temperature.

In the polymerization of the polymerization process according to the present invention, the solid titanium catalyst component (I) is used in an amount in terms of titanium atom of usually about 0.0001 to 0.5 mmol, preferably about 0.005 to 0.1 mmol per 1 l of the polymerization volume. Furthermore, the organometallic compound catalyst component (II) is used in an amount in terms of metal atom of usually about 1 to 2000 mol, preferably about 5 to 500 mol per 1 mol of titanium atom of the prepolymerization catalyst component in the polymerization system. When the electron donor (III) is used, it is used in an amount of usually 0.001 to 50 mol, preferably 0.01 to 30 mol, especially 0.05 to 20 mol per 1 mol of metal atom of the organometallic compound catalyst component (II).

The use of hydrogen in the polymerization can regulate the molecular weight of a resulting polymer and can prepare a polymer having a high melt flow rate.

In the polymerization of the present invention, the temperature of the olefin polymerization is set to be usually about from 20 to 100° C., preferably about 50 to 90° C., and the pressure is set to be usually from atmospheric pressure to 100 Kg/cm$^2$, preferably about 2 to 50 Kg/cm$^2$. In the polymerization process of the present invention, the polymerization can be carried out in any method of batch, semi-continuous and continuous methods. Moreover, the polymerization can be also carried out dividedly in two or more steps by varying the reaction conditions.

The olefin polymer thus prepared may be any one of a homopolymer, a random copolymer and a block copolymer.

When the olefin polymerization is carried out using the above olefin polymerization catalyst, particularly the propylene polymerization is carried out, a propylene polymer having a content of components insoluble in decane of not less than 70%, preferably not less than 85%, especially not less than 90% and high stereoregularity can be prepared.

The polyolefins, particularly polypropylene obtainable by the olefin polymerization process of the present invention are polymers having a wide molecular weight distribution without carrying out multi-step polymerization. Particularly, as compared with conventional polymers having the same melt flow rate (MFR), it is possible in the present invention to prepare polymers having a higher content of components having a high molecular weight and a lower content of components having a low molecular weight (which are called as sticky components). This characteristic can be confirmed by carrying out gel permeation chromatography (GPC) measurement as described later. Polymers having a high Mw/Mn value can be prepared.

Conventionally known polypropylenes obtainable by using a solid titanium catalyst component containing magnesium, titanium, a halogen and an electron donor usually have an Mw/Mn value of not more than 5 in an MFR region of 1 to 10 g/10 min, which value is an index of a molecular weight distribution as determined by GPC measurement. However, using the olefin polymerization process of the present invention, polypropylenes having an Mw/Mn of not less than 6, preferably not less than 7 can be prepared in the above same polymerization conditions. It is known to a person skilled in the art that polypropylenes having a high Mw/Mn value have excellent moldability and rigidity. Meanwhile, when the Mw/Mn value is too high, components of a high molecular weight cause fish-eye in the uses of films and the like that require transparency. Therefore, the upper limit of the Mw/Mn is preferably 30, more preferably 25, furthermore preferably 20.

Since the use of the olefin polymerization process of the present invention can prepare olefin polymers having a wide molecular weight distribution without carrying out the multi-step polymerization, the apparatus for producing the polymers can be more simplified. Moreover, when the present process is applied on conventional multi-step polymerization methods, the molecular weight distribution can be wider and it is expected that polymers having excellent melt tension and moldability can be prepared.

As other methods for preparing polymers having a wide molecular weight distribution, there are a method of dissolving and mixing polymers having different molecular weights, and a method of melt-kneading them. These methods, however, are insufficient for the improvements of melt tension and moldability irrespective of their comparatively complicated operations. This is presumed that polymers having different molecular weights are basically difficult to be mixed. Meanwhile, it is presumed that the polymers obtainable by the olefin polymerization process of the present invention have high melt tension and excellent moldability as the polymers having different molecular weights which vary in a very wide range are mixed at a catalyst level, namely nano-level.

As the olefin polymers obtainable by using the olefin polymerization process of the present invention have a wide molecular weight distribution, they have excellent moldability and rigidity. Furthermore, since when the solid titanium catalyst having a large particle diameter is used, the particles are hardly scattered in the impact copolymer production, polymers having a high rubber content can be prepared with high productivity.

Accordingly, the above olefin polymers can be used for the productions of multipurpose films such as injection molded articles, extrusion molded articles, blow molded articles, vacuum and pressure forming molded articles, calendar molded articles, stamping molding molded articles, stretched films and inflation films and various kinds of films in special uses such as films for capacitors and the like, and thereby can be used in wide fields such as container packaging materials, automobile components and other industrial materials. Moreover, the olefin polymers do not generate harmful gases in burning treatment thereof and the calorific values generated thereof are higher as compared with coal, which is a representative of a solid fuel. Therefore, the olefin polymers are important materials for use as a solid fuel after they have been got through work as container packaging materials, industrial materials and the like.

EXAMPLES

The present invention will be described with reference to the following examples below, but it should not be limited by these examples.

In the following examples, the bulk density, melt flow rate, content of components soluble (insoluble) in decane, molecular weight distribution and catalyst particle diameter of a propylene polymer were measured in the following methods.

(1) Bulk Density (BD):
The bulk density was measured in accordance with JIS K-6721.
(2) Melt Flow Rate (MFR):
The melt flow rate was measured at a measurement temperature of 190° C. in accordance with ASTM D1238E.
(3) Content of Components Soluble (Insoluble) in Decane
In a glass measuring vessel, about 3 g of a propylene polymer which was measured until a $10^{-4}$ g unit and taken as b gram, 500 ml of decane and a heat resistant stabilizer soluble in a small amount of decane were introduced and the propylene polymer was dissolved in a nitrogen atmosphere while stirring with a stirrer and increasing the temperature to 150° C. over 2 hr. This temperature was maintained for 2 hr and thereafter the mixture was cooled to 23° C. over 8 hr. A resulting solution containing a deposit of the propylene polymer was filtered off under reduced pressure with a glass filter (standard for 25G-4 manufactured by Iwata Glass Co.). 100 ml of the filtrate was collected and dried under reduced pressure to prepare a part of components soluble in decane was prepared and the weight was measured until a $10^{-4}$ g unit (a gram). After this procedure, the content of the components soluble in decane was determined by the following formula.

Content of components soluble in decane=100×(500× a)/(100×b)

Content of components insoluble in decane=100-100× (500×a)/(100×b)

(4) Molecular Weight Distribution
Liquid chromatograph: ALC/GPC 150-C plus type (differential refractometer detector unified type) manufactured by Waters Corporation.
Column: GMH-6-HT×2 columns and MGH6-HTL×2 columns manufactured by Tosoh Corporation were connected in series.
Mobile phase medium: o-dichlorobenzene
Flow rate: 1.0 ml/min
Measuring temperature: 140° C.
Method of making calibration curve: a standard polystyrene sample was used.
Sample concentration: 0.10% (w/w)
Amount of Sample solution: 500 µl
The molecular weight was measured in the above conditions and the resulting chromatogram was analyzed by a known method and thereby the Mw/Mn value and the Mz/Mw value were calculated. The measuring time per one sample was 60 min.
(5) Catalyst Particle Diameter:
The catalyst particle diameter was analyzed using a laser light scattering diffraction particle size distribution measuring device (LS13320) manufactured by Beckman Coulter, Inc. In the analysis, the refractive index of a dispersion medium was 1.412, the refractive index of the sample was 1.68 and e factor was 0.7.

As the compounds applicable to the ester compound (B) and the ester compound (b) of the present invention, synthesized compounds manufactured by Azuma Co., Ltd were used unless specified. Moreover, the purities of the trans and cis isomers were 95% or more unless specified.

Example 1

Preparation of Solid Titanium Catalyst Component (α1)

75 g of anhydrous magnesium chloride, 280.3 g of decane and 308.3 g of 2-ethylhexyl alcohol were reacted with heating at 130° C. for 3 hr to prepare a homogeneous solution. To the solution, 30.3 g of cyclohexane-1,2-n-propyl dicarboxylate was added and further mixed with stirring at 130° C. for 1 hr.

The homogeneous solution thus prepared was cooled to room temperature. Thereafter, all of 38 ml of this homogeneous solution was dropped into 100 ml of titanium tetrachloride kept at −24° C. with stirring at a rotation rate of 200 rpm over 45 min. After completion of the dropping, the temperature of the mixed solution was increased to 110° C. over 5.3 hr and when it reached 110° C., cyclohexane 1,2-diisobutyl dicarboxylate (trans proportion of 78%) was added in an amount of 0.05 mol times per Mg atom to the mixed solution and held with stirring at the same temperature for 35 min. After completion of the reaction, a solid part was collected by filtration with heat and then re-suspended in 100 ml of titanium tetrachloride. Thereafter, heat reaction was carried out again at 110° C. for 35 min. After completion of the reaction, a solid part was collected by filtration with heat again, and was thoroughly washed with decane and hexane at 100° C. until liberated titanium compounds were not detected. The solid titanium catalyst component (α1) prepared by the above procedure was kept as a decane slurry. A part of the decane slurry was dried for examining the catalyst composition. The solid titanium catalyst component (α1) thus prepared has a composition that titanium was 2.7% by mass, magnesium was 18% by mass, cyclohexane 1,2-diisobutyl dicarboxylate was 4.2% by mass and a 2-ethylhexyl alcohol residue was 1.4% by mass. The catalyst particle diameter was 25 μm.
Polymerization To a 2 l internal volume polymerization reactor, 500 g of propylene and 1 NL of hydrogen were added at room temperature. Thereafter, 0.5 mmol of triethylaluminum, 0.1 mmol of cyclohexylmethyl dimethoxysilane and 0.004 mmol in terms of titanium atom of the solid titanium catalyst component (α1) were added and the inside temperature of the polymerization reactor was speedily increased to 70° C. The polymerization was carried out at 70° C. for 1 hr. Thereafter, the reaction was terminated by a small amount of methanol and propylene was purged. Furthermore, resulting polymer particles were dried under reduced pressure at 80° C. overnight. The activity, the bulk density, MFR, the amount of components insoluble in decane and the molecular weight distribution (Mw/Mn, Mz/Mw) were shown in Table 1.

Example 2

Preparation of Solid Titanium Catalyst Component (α2)

The procedure of Example 1 was repeated except for using a mixture of cyclohexane-1,2-di-n-propyl dicarboxylate (15.1 g) and ethyl benzoate (8.8 g) in place of cyclohexane-1,2-di-n-propyl dicarboxylate, to prepare a solid titanium catalyst component (α2). The catalyst particle diameter was 26 μm.
Polymerization Propylene polymerization was carried out in the same manner as in Example 1 except for using the solid titanium catalyst component (α2). The results were shown in Table 1.

Example 3

Preparation of Solid Titanium Catalyst Component (α3)

The procedure of Example 2 was repeated except for changing the stirring rotation rate to 350 rpm from 200 rpm, to prepare a solid titanium catalyst component (α3). The catalyst particle diameter was 19 μm.
Polymerization Propylene polymerization was carried out in the same manner as in Example 1 except for using the solid titanium catalyst component (α3). The results were shown in Table 1.

Example 4

Preparation of Solid Titanium Catalyst Component (α4)

The procedure of Example 1 was repeated except for using a mixture of cyclohexane-1,2-di-n-propyl dicarboxylate (10.1 g) and ethyl benzoate (11.7 g) in place of cyclohexane-1,2-di-n-propyl dicarboxylate, to prepare a solid titanium catalyst component (α4). The catalyst particle diameter was 26
Polymerization Propylene polymerization was carried out in the same manner as in Example 1 except for using the solid titanium catalyst component (α4). The results were shown in Table 1.

Example 5

Preparation of Solid Titanium Catalyst Component (α5)

The procedure of Example 1 was repeated except for using a mixture of cyclohexane-1,2-di-n-propyl dicarboxylate (7.6 g) and ethyl benzoate (13.2 g) in place of cyclohexane-1,2-di-n-propyl dicarboxylate, to prepare a solid titanium catalyst component (α5). The catalyst particle diameter was 32 μm.
Polymerization Propylene polymerization was carried out in the same manner as in Example 1 except for using the solid titanium catalyst component (α5). The results were shown in Table 1.

Example 6

Preparation of Solid Titanium Catalyst Component (α6)

The procedure of Example 1 was repeated except for using a mixture of cyclohexane-1,2-di-n-propyl dicarboxylate (4.3 g) and ethyl benzoate (15.1 g) in place of cyclohexane-1,2-di-n-propyl dicarboxylate, to prepare a solid titanium catalyst component (α6). The catalyst particle diameter was 27 μm.
Polymerization Propylene polymerization was carried out in the same manner as in Example 1 except for using the solid titanium catalyst component (α6). The results were shown in Table 1.

Example 7

Preparation of Solid Titanium Catalyst Component (α7)

The procedure of Example 1 was repeated except for using cyclohexane-1,2-di-i-propyl dicarboxylate in place of cyclohexane-1,2-di-n-propyl dicarboxylate, to prepare a solid titanium catalyst component (α7). The catalyst particle diameter was 29 μm.
Polymerization Propylene polymerization was carried out in the same manner as in Example 1 except for using the solid titanium catalyst component (α7). The results were shown in Table 1.

Example 8

Preparation of Solid Titanium Catalyst Component (α8)

The procedure of Example 7 was repeated except for changing the stirring rotation rate to 350 rpm from 200 rpm, to prepare a solid titanium catalyst component (α8). The catalyst particle diameter was 20 μm.
Polymerization
Propylene polymerization was carried out in the same manner as in Example 1 except for using the solid titanium catalyst component (α8). The results were shown in Table 1.

Example 9

Preparation of Solid Titanium Catalyst Component (α9)

The procedure of Example 1 was repeated except for using cyclohexane-1,2-di-ethyl dicarboxylate in place of cyclohexane-1,2-di-n-propyl dicarboxylate and changing the stirring rotation rate to 250 rpm from 200 rpm, to prepare a solid titanium catalyst component (α9). The catalyst particle diameter was 18 μm.
Polymerization
Propylene polymerization was carried out in the same manner as in Example 1 except for using the solid titanium catalyst component (α9). The results were shown in Table 1.

Comparative Example 1

Synthesis of Solid Titanium Catalyst Component (β1)

The procedure of Example 1 was repeated except for using n-propyl benzoate (special grade chemicals, manufactured by Wako Pure Chemical Industries, Ltd.) in place of cyclohexane-1,2-di-n-propyl dicarboxylate, to prepare a solid titanium catalyst component (β1). The catalyst particle diameter was 13 μm.
Polymerization
Propylene polymerization was carried out in the same manner as in Example 1 except for using the solid titanium catalyst component (β1). The results were shown in Table 1.

Comparative Example 2

Synthesis of Solid Titanium Catalyst Component (β2)

The procedure of Example 1 was repeated except for using di-n-propyl phthalate (special grade chemicals, manufactured by Wako Pure Chemical Industries, Ltd.) in place of cyclohexane-1,2-di-n-propyl dicarboxylate, to prepare a solid titanium catalyst component (β2). The catalyst particle diameter was 7 μm.
Polymerization
Propylene polymerization was carried out in the same manner as in Example 1 except for using the solid titanium catalyst component (β2). The results were shown in Table 1.

Comparative Example 3

Synthesis of Solid Titanium Catalyst Component (β3)

The procedure of Example 1 was repeated except for using ethyl benzoate in place of cyclohexane-1,2-di-n-propyl dicarboxylate, to prepare a solid titanium catalyst component (β3). The catalyst particle diameter was 18 μm.
Polymerization
Propylene polymerization was carried out in the same manner as in Example 0.1 except for using the solid titanium catalyst component (β3). The results were shown in Table 1.

Comparative Example 4

Synthesis of Solid Titanium Catalyst Component (β4)

The procedure of Comparative Example 3 was repeated except for changing the stirring rotation rate to 250 rpm from 200 rpm, to prepare a solid titanium catalyst component (β4). The catalyst particle diameter was 15 μm.
Polymerization
Propylene polymerization was carried out in the same manner as in Example 1 except for using the solid titanium catalyst component (β4). The results were shown in Table 1.

Comparative Example 5

Synthesis of Solid Titanium Catalyst Component (β5)

The procedure of Example 1 was repeated except for using phthalic anhydride in place of cyclohexane-1,2-di-n-propyl dicarboxylate, to prepare a solid titanium catalyst component (β5). The catalyst particle diameter was 18 μm.
Polymerization
Propylene polymerization was carried out in the same manner as in Example 1 except for using the solid titanium catalyst component (β5). The results were shown in Table 1.

TABLE 1

|   | Activity/ (Kg-PP/ g-cat.) | Bulk density/ (g/ml) | MFR/ (g/10 man) | Amount of component insoluble in decane/ % | Mw/Mn | Mz/Mw | Stirring rotation rate/ rpm | Catalyst particle diameter/ μm |
|---|---|---|---|---|---|---|---|---|
|   |   |   |   | Example |   |   |   |   |
| 1 | 34.4 | 0.34 | 3.2 | 98.5 | 7.4 | 3.9 | 200 | 25 |
| 2 | 41.4 | 0.38 | 3.7 | 98.3 |   |   | 200 | 26 |
| 3 | 35.3 | 0.40 | 3.4 | 98.3 |   |   | 350 | 19 |
| 4 | 42.0 | 0.38 | 3.2 | 98.2 |   |   | 200 | 26 |
| 5 | 32.1 | 0.40 | 3.5 | 98.1 |   |   | 200 | 32 |
| 6 | 35.0 | 0.40 | 3.6 | 98.2 |   |   | 200 | 27 |
| 7 | 38.5 | 0.35 | 4.3 | 97.4 |   |   | 200 | 29 |
| 8 | 39.2 | 0.38 | 4.6 | 97.1 |   |   | 350 | 20 |
| 9 | 36.9 | 0.34 | 3.5 | 98.3 |   |   | 250 | 18 |

TABLE 1-continued

|   | Activity/ (Kg-PP/ g-cat.) | Bulk density/ (g/ml) | MFR/ (g/10 man) | Amount of component insoluble in decane/ % | Mw/Mn | Mz/Mw | Stirring rotation rate/ rpm | Catalyst particle diameter/ μm |
|---|---|---|---|---|---|---|---|---|
| | | | | Comparative Example | | | | |
| 1 | 35.6 | 0.46 | 4.1 | 97.0 | | | 200 | 13 |
| 2 | 26.7 | 0.35 | 5.5 | 97.9 | | | 200 | 7 |
| 3 | 30.9 | 0.43 | 4.2 | 98.2 | 7.8 | 5.1 | 200 | 18 |
| 4 | 33.9 | 0.45 | 3.8 | 98.2 | 7.5 | 4.7 | 250 | 15 |
| 5 | 22.0 | 0.45 | 5.8 | 98.0 | 5.2 | 3.8 | 200 | 18 |

The invention claimed is:

1. A process for producing a solid titanium catalyst component (I) comprising titanium, magnesium, halogen and an ester compound which comprises:
contacting a mixture of a magnesium compound (A) having no reducing ability in a liquid state and an ester compound (B) represented by the following formula (2) with a liquid titanium compound (C) to form a solid titanium composite, and then contacting the solid titanium composite with an ester compound (B1) represented by the formula (3),
wherein the compound of formula (2) is:

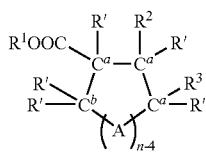

(2)

wherein n is an integer of 6,
$R^2$ is $COOR^1$, $R^3$ is $R'$ and the cyclic skeleton contains only single bonds,
$R^1$ each is independently a monovalent hydrocarbon group having 2 or 3 carbon atoms, and A is

heteroatom, and
or a,
two or more R' each are independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and at least two of the two or more R' may be bonded to each other to form a ring, and the skeleton of the ring formed with the two or more R' may include a double bond or a heteroatom,
wherein the compound of formula (3) is:

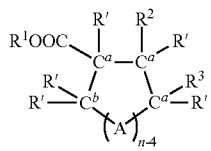

(3)

wherein n is an integer of 5 to 10,
$R^2$ and $R^3$ each are independently $COOR^1$ or $R'$ and at least one of $R^2$ and $R^3$ is $COOR^1$, wherein a single bond in the cyclic skeleton, excluding $C^a$-$C^a$ bonds and $C^a$-$C^b$ bonds, that $R^3$ is a hydrogen atom may be replaced with a double bond,
two or more $R^1$ each are independently a monovalent hydrocarbon group having 1 to 20 carbon atoms, and A is

heteroatom, and
or a,
two or more R' each are independently an atom or group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group, and at least two of the two or more R' may be bonded to each other to form a ring, and the skeleton of the ring formed with the two or more R' may include a double bond or a heteroatom.

* * * * *